US009712239B2

(12) United States Patent
Murshid et al.

(10) Patent No.: US 9,712,239 B2
(45) Date of Patent: Jul. 18, 2017

(54) METHOD AND APPARATUS FOR MULTIPLEXED OPTICAL COMMUNICATION SYSTEM USING SPATIAL DOMAIN MULTIPLEXING (SDM) AND ORBITAL ANGULAR MOMENTUM OF PHOTON (OAM) MULTIPLEXING WITH WAVELENGTH DIVISION MULTIPLEXING (WDM)

(71) Applicant: Florida Institute of Technology, Inc., Melbourne, FL (US)

(72) Inventors: Syed H. Murshid, West Melbourne, FL (US); Saud Alanzi, Melbourne, FL (US); Bilas Chowdhury, Melbourne, FL (US)

(73) Assignee: Florida Institute of Technology, Inc., Melbourne, FL (US)

( * ) Notice: Subject to any disclaimer, the term of this patent is extended or adjusted under 35 U.S.C. 154(b) by 0 days.

(21) Appl. No.: 15/018,370

(22) Filed: Feb. 8, 2016

(65) Prior Publication Data

US 2016/0233959 A1 Aug. 11, 2016

Related U.S. Application Data

(60) Provisional application No. 62/113,060, filed on Feb. 6, 2015.

(51) Int. Cl.
*H04J 14/02* (2006.01)
*H04B 10/2581* (2013.01)
*H04J 14/04* (2006.01)

(52) U.S. Cl.
CPC ...... *H04B 10/2581* (2013.01); *H04J 14/0223* (2013.01); *H04J 14/04* (2013.01)

(58) Field of Classification Search
CPC .. H04B 10/25753; H04B 10/70; H04B 10/25; H04J 14/04; H04J 14/02; H04J 14/00
(Continued)

(56) References Cited

U.S. PATENT DOCUMENTS 7,174,067 B2 2/2007 Murshid et al.
7,639,909 B2 12/2009 Murshid et al.
(Continued)

OTHER PUBLICATIONS

Syed H. Murshid, Abhijit Chakravarty, Experimental results from copropagating analog channels of same wavelength over 600-meter-long standard step index multimode fiber,SPIE Journal of Optical Engineering, Opt. Eng. 47, 105002, Oct. 2008.
(Continued)

*Primary Examiner* — Don N Vo
(74) *Attorney, Agent, or Firm* — Stephen C. Thomas

(57) ABSTRACT

A multiplexed optical communication system comprising a carrier optical fiber, a plurality of launching light sources, and a matching plurality of multiplexer/demultiplexers and photodetectors is described and claimed. Optical communication channel separation by Spatial Domain Multiplexing (SDM), Optical Angular Momentum (OAM) multiplexing, and Wavelength Division Multiplexing (WDM) is used in combination to achieve significant increase in optical communication channel bandwidth over the prior art. The launching light sources may be positioned such that the light beams are incident on the receiving end of the carrier optical fiber at desired angles including complementary angles. Crosstalk between optical communication channels is minimal. The communication bandwidth of a TDM system may be increased by an order of magnitude due the layered WDM/SDM/OAM data multiplexing of the invention.

19 Claims, 19 Drawing Sheets

(58) Field of Classification Search
 USPC .......................................................... 398/79
 See application file for complete search history.

(56) References Cited

U.S. PATENT DOCUMENTS

| 8,396,371 | B2 | 3/2013 | Murshid et al. | |
|---|---|---|---|---|
| 9,531,427 | B2* | 12/2016 | Henry | H04B 3/52 |
| 2003/0174942 | A1* | 9/2003 | Murshid | B64D 47/02 385/31 |
| 2011/0150464 | A1 | 6/2011 | Murshid et al. | |
| 2015/0309249 | A1* | 10/2015 | Murshid | H04B 10/2581 398/55 |
| 2015/0323405 | A1* | 11/2015 | Halmetschlager | E21B 47/06 356/32 |

OTHER PUBLICATIONS

Hus, Rick C.J., Tarighat Alireza, Shah Akhil, Sayed, Ali H., Jalali Bahram, Capacity enhancement in coherent optical MIMO (COMIMO) multimode fiber links, IEEE Communications Letters, pp. 195-197, vol. 10, No. 3, Mar. 2006.
Syed H. Murshid, Abhijit Chakravarty, Multiplying Bandwidth of Multi-mode optical fibers through application of spatial domain multiplexing, Avionics, Fiber-Optics and Photonics Technology Conference (AVFOP), 2012 IEEE, vol., No., pp. 76,77, Sep. 11-13, 2012.
Changyu Lin, Ivan B. Djordjevic, Milorad Cvijetic, Quantum Few-Mode Fiber Communications Based on the Orbital Angular Momentum, IEEE Photonics Technology Letters, vol. 25, No. 1, Jan. 1, 2013.
Syed Murshid, B. Grossman, P. Narakorn, Spatial Domain Multiplexing: A new Dimension in Fiber Optic Multiplexing, Elsevier Optics & Laser Technology Journal 40 (Apr. 2008) 1030-1036.
S. Murshid, S. Alanzi, R. Enaya, A. Chakravarty, G. Parhar, G. Lovell, B. Chowdhury, Hybrid Optical Fiber architecture combining orbital angular momentum of photons and spatial domain multiplexing with wavelength division multiplexing for higher data rates, FIO-OSA 2014.
Syed Murshid, Greg Lovel, Bilar Chowdhury, Arnob Hridoy, Gurinder Parhar, Abhijit Chakravarty, Saud Alanzi, Analysis of Spatial Domain Multiplexing/Space division Multiplexing (SDM) Based Hybrid Architectures Operating in Tandem with Wavelength Multiplexing, Optics and Photonics, SPIE 2014.
Syed Murshid, Saud Alanzi, Arnob Hridoy, Greg Lovel, Gurinder Parhar, Abhijit Chakravarty, Bilar Chowdhury, An order of magnitude improvement in optical fiber bandwidth using spatial domain multiplexing/space division multiplexing (SDM) in conjunction with orbital angular momentu (2014).
Karimi., E, Boyd, R.W., De La Hoz, P., De Guise, H., Rehacek, J., Hradil. Z., Leuchs, G., Sanchez-Soto, L.L., Lost and Found: the radial quantum number of Laguerre-Gauss modes., Jan. 21, 2014.
Murshid, Syed., Zahir, Ebad., Chakravarty, Abhijit., "SDM Propagation Model for Multiple Channels Using Ray Theory", Proceeding of SPIE Defence, Security + Sensing 2010, Proceeding of Enabling Photonics Technologies for Defence, Security, and Aerospace Applications, vol. 7682, DOI: 10.0007/12.850577, 2010.
Murshid, Syed., Zahir, Ebad, Biswas, Raka., et al., "SDM propagation model for multiple channels using electromagnetic theory and vortex analysis", Proceeding of SPIE Defence, Security + Sensing 2010, Enabling Photonics Technologies for Defense, Security, and Aerospace Applications, vol. 7682, DOI: 10.1117/12.850584, 2010.
Murshid, Syed., Biswas, Raka., Chakravarty, Abhijit., "CAD model for co-propagating spatially multiplexed channels of same wavelength over standard multimode fibers", Proceedings of SPIE Defense, Security + Sensing 2009 SPIE Paper No. 7339-22, (2009).
Khonina, S.N., Kazanskiy, N.L., Soifer, V.A., "Optical Vortices in a Fiber: Mode Division Multiplexing and Multimode Self-Imaging", Recent Progress in Optical Fiber Research, (2012).
Yao, A.M., Padgett, M.J., "Orbital Angular momentum: origins, behavior and applications. Advances in Optics and Photonics", 3 (2). p. 161 (2011).
Murshia, Syed., Chakravarty, Abhijit., Biswas Raka., "Simultaneous transmission of two channels operating at the same wavelength in standard multimode fibers," OSA (2008).
Djordjevic, Ivan., Coded Orbital Angular Momentum (OAM) Modulation Based Heterogeneous Optical Networking, ICTON 2011.
Murshid, Syed., Chakravarty, Abhijit., Multiplying Bandwidth of Multi-Mode Optical Fibers through Application of Spatial Domain Multiplexing, (2012).
Murshia, Syed., Chakravarty, Abhijit., Biswas Raka., "CAD model for co-propagating spatially multiplexed channels of same wavelengths over standard multimode fibers", Proceedings of SPIE Defense, Security + Sensing 2009, SPIE Paper No. 7339-22, (2009).
Murshid, S., Alanzi, S., Hridoy, A., Lovel, G., Parhar, G., Chakravarty, A., Chowdhury, B., An order of magnitude improvement in optical fiber bandwidth using spatial domain multiplexing/space division multiplexing (SDM) in conjunction with orbital angular momentum (OAM), Prov. of SPIE vol. 9202 (2014).
Murshid, S.,Lovel, G., Chowdhury, B., Hridoy, A., Parhar, G., Alanzi, S., Chakravarty, A., Analysis of Spatial Domain Multiplexing/Space Division Multiplexing (SDM) Based Hybrid Architectures Operating in Tandem with Wavelength Division Multiplexing, Proc. of SPIE vol. 9202 (2014).
Levy, Uri., Kobrinsky, Haim., Friesem, Albert., Angular Multiplexing for Multichannel Communication in a Single Fiber, IEEE Journal of Quantum Electronics, vol. QE-1-7, No. 11, Nov. 1981.
Beijersbergen, M.W., Allen, L., Van Der Veen, Helo., Woerdman, J.P., Astigmatic laser mode converters and transfer of orbital angular momentum, Optics Communications 96 (1993) 123-132.
Arlt, J., Hitomi, T., Dholakia, K., Atom guiding along Laguerre-Gaussian and Bessel light beams, Appl. Phys. B 71, 549-554 (2000).
Bye, J.F., Berry, M.V., Dislocations in Wave Trains, Proc. R. Soc. Long. A. 336, 165-190 (1974).
Hsu, Rick C.J., Tarighat, Alireza, Capacity Enhancement in Coherent Optical MIMO (COMIMO) Multimode Fiber Links, IEE Communications Letters, vol. 10, No. 3, Mar. 2006.
Clark, L., Lloyd, S., Babiker, M., Yuan, J., Electron Beams with a Twist, Journal of Physics, Electron Microscopy and Analysis Group Conference (2012).
Murshid, Syed., Chakravarty, Abhijit., "Experimental results from copropagating analog channels of same wavelength over 600-meter-long standard step index multimode fiber", Journal of Optical Engineering, vol. 47(10), 105002(1)-105002(4), (2008).
Chakravarty, Abhijit., Murshid, Syed., "Comparison of Experimental and Mathematical Models of Attenuation and Dispersion for Co-Propagating Helical Channels of Same Wavelength in Optical Fibers," Journal of Sensors, and command, control, communications, and intelligence (C3I) technologies for homeland security and homeland defense IX Apr. 5-9, 2010.
Murshid, Syed., Chakravarty, Abhijit., "Attenuation and bit error rate for four co-propagating spatially multiplexed optical communication channels of exactly same wavelength in step index muiltimode fibers," Proceedings of SPIE vol. 8054 (2011).
Aurora, R.K, Lu, Z., "Graphical Study of Laguerre-Gaussian Beam modes," IEE Proc-Microw vol. 141 No. 3 Jun. 1994.
Karimi, E, Boyd, R.W., De La Hoz, P., De Guise, H., Rehacek, J., Hradil, Z., Aiella, A., Leuchs, G., Sanchez-Soto, L.L., "Radial quantum number of Laguerre-Gauss modes," Jun. 18, 2014.
Murshid, Syed., Muralikrishnan, Hari., Kozaitis, Samuel., "Mathematical Modeling and Experimental Analysis of Multiple Channel Orbital Angular Momentum in Spatial Domain Multiplexing," Proceedings of SPIE vol. 8397 (2012).
Hsu, Rick C.J., Tarighat, Alireza., "Capacity Enhancement in Coherent Optical MIMO (COMIMO) Multimode Fiber Links," IEEE Communications Letters, vol. 10 No. 3, Mar. 2006.
Murshid, Syed., Chakravarty, Abhijit., "Multiplying Bandwidth of Multi-Mode Optical Fibers Through Application of Spatial Domain Multiplexing," IEEE Communications Letters (2012).

(56) References Cited

OTHER PUBLICATIONS

Savchenkov, A., Matsko, A., Grudinin, I., Savchenkova, E., Strekalov, D., Maleki, L., "Optical vortices with large orbital momentum: Generation and interference," Optics Express 2897, vol. 14, No. 7 Apr. 3, 2006.

Allen, L., Beijersbergen, M.W., Spreeuw, R.J.C., Woerdman, J.P., "Orbital angular momentum of light and the transformation of Laguerre-Gaussian Laser Modes," The American Physical Society, vol. 45 No. 11, Jun. 1, 1992.

Volke-Sepulveda, K., Garces-Chavez, V., Chavez-Cerda, S., Arlt, J., Dholakia, K., "Orbital angular momentum of a high-order Bessel Light Beam," J. Opt. B: Quantum Semiclass. Opt. 4 (2002) S82-S89.

Alexeyev, A.N., Fadeyeva, T.A., Volyar, A.V., "Optical vortices and the flow of their angular momentum in a multimode fiber," (1998).

Volyar, A.V., Fadeeva, T.A., "Optics of Singularities of the Field of a Low-Mode Fiber: I. Circular Disclinations," Optics and Spectroscopy, vol. 85, No. 2, 1998 pp. 264-271.

Feit, M.D., Fleck Jr., J.A., "Light Propagation in graded-index optical fibers," Applied Optics, vol. 17, No. 24 Dec. 15, 1978.

Lin, Changyu., Djordjevic, Ivan., Cvijetic, Milorad., "Quantum Few-Mode Fiber Communications Based on the Orbital Angular Momentum," IEEE Photonics Technology Letters, vol. 25, No. 1, Jan. 1, 2013.

Murshid, S., Grossman, G., Narakorn, P., "Spatial domain multiplexing: A new dimension in fiber optic multiplexing," Journal of Optics & Laser technology 40 (2008) 1030-1036.

Khonina, S.N., Volotovsky, S.G., "Self-Reproduction of Multimode Laser Fields in Weakly Guiding Stepped-Index Fibers," Information Optics, 2007, vol. 16 No. 3 pp. 167-177.

Murshid, S. H., Khayratee, A., "Multiplexing of Optical channels as a function of orbital angular momentum of photons," (CD) Optical Society of America (2008), paper FThE6.

Murshid, S., Grossman, B., Narakorn, P., "Spatial domain multiplexing: A new dimension in fiber optic multiplexing," Optics & laser Technology, 40 (2008) 1030-1036.

Murshid S., Alanzi, S., Hridoy, A., Lovel, G., Parhar, G., Chakravarty, A., Chowdhury, B., An order of magnitude improvement in optical fiber bandwidth using spatial domain multiplexing/space division multiplexing (SDM) in conjunction with orbital angular momentum (2014).

Murshid, S., Lovel, D., Chowdhury, B., Hridoy, A., Parhar, G., Chakravarty, A., Alanzi, S., Analysis of Spatial Domain multiplexing space division multiplexing (SDM) (2014).

Sundbeck, S., Gruzberg, I., "Structure and scaling of helical modes of light," Mar. 1, 2005, vol. 30, No. 5 Optics Letters.

Curtis, J., Grier, D., "Structure of Optical Vortices," Physical Review Letters, vol. 90 No. 13 Apr. 4, 2003.

Padgett, M., Barnett, S., Loudon, R., "The angular momentum of light inside a dielectric," Journal of Modern Optics, 2003, vol. 50, No. 10 1555-1562.

Jenkins, R.M., Banerji, J., Davies, A.R., "The generation of optical vortices and shape preserving vortex arrays in hollow multimode waveguides," J. Opt. Pure Ap(2001) 527-53.

Sjoholm, J., Palmer, K., "Angular Momentum of Electromagnetic Radiation," May 2, 2007.

Georg, O., "Use of the orthogonal system of laguerre-gaussian functions in the theory of circularly symmetric optical waveguides," Optical Society of America (1982) vol. 21.

Soskin, M., Gorshkov, V., Vasnetsov, M., "Topological charge and angular momentum of light beams carrying optical vortices," Physical Review, vol. 56 No. 5 Nov. 1997.

Chang, C., Cassaboom, J., Taylor, H., "Highspeed Digital Signal Transmission experiments by optical wavelength division multiplexing," Elec. Letters (1997) vol. 13 No. 22.

\* cited by examiner

| Incident angle, $\theta_i°$ | Input radius of SDM channel (cm) | Output radius (cm) | Avg. radius (cm) | Transmitted angle, $\theta_t° = tan^{-1}(\frac{r_{avg}}{L})$ |
|---|---|---|---|---|
| 4 | center | image | 0.25 | 4.205357 |
| 5 | 0.25 | 0.4 | 0.325 | 5.460213 |
| 6 | 0.3 | 0.4 | 0.35 | 5.877393 |
| 7 | 0.4 | 0.5 | 0.45 | 7.539445 |
| 8 | 0.45 | 0.55 | 0.5 | 8.365886 |
| 9 | 0.5 | 0.6 | 0.55 | 9.188836 |
| 10 | 0.575 | 0.65 | 0.613 | 10.212113 |
| 11 | 0.65 | 0.75 | 0.7 | 11.63363 |
| 12 | 0.7 | 0.8 | 0.75 | 12.43956 |
| 13 | 0.75 | 0.85 | 0.8 | 13.24052 |

| Incident angle, $\theta_i^\circ$ | Input radius of SDM channel (cm) | Output radius (cm) | Avg. radius (cm) | Transmitted angle, $\theta_t^\circ = tan^{-1}(\frac{r_{avg}}{L})$ |
|---|---|---|---|---|
| 4 | center | image | 0.25 | 4.205357 |
| 5 | 0.25 | 0.4 | 0.325 | 5.460213 |
| 6 | 0.3 | 0.4 | 0.35 | 5.877393 |
| 7 | 0.4 | 0.5 | 0.45 | 7.539445 |
| 8 | 0.45 | 0.55 | 0.5 | 8.365886 |
| 9 | 0.5 | 0.6 | 0.55 | 9.188836 |
| 10 | 0.575 | 0.65 | 0.613 | 10.212113 |
| 11 | 0.65 | 0.75 | 0.7 | 11.63363 |
| 12 | 0.7 | 0.8 | 0.75 | 12.43956 |
| 13 | 0.75 | 0.85 | 0.8 | 13.24052 |

FIG. 6

| Incident angle, $\theta_i°$ | Input radius of SDM channel (cm) | Output radius (cm) | Avg. radius (cm) | Transmitted angle, $\theta_t° = tan^{-1}(\frac{r_{avg}}{L})$ |
|---|---|---|---|---|
| 4 | center | image | 0.25 | 4.205357 |
| 5 | 0.25 | 0.4 | 0.325 | 5.460213 |
| 6 | 0.3 | 0.4 | 0.35 | 5.877393 |
| 7 | 0.4 | 0.5 | 0.45 | 7.539445 |
| 8 | 0.45 | 0.55 | 0.5 | 8.365886 |
| 9 | 0.5 | 0.6 | 0.55 | 9.188836 |
| 10 | 0.575 | 0.6 | 0.588 | 9.83568 |
| 11 | 0.65 | 0.75 | 0.7 | 11.63363 |
| 12 | 0.7 | 0.8 | 0.75 | 12.43956 |
| 13 | 0.75 | 0.85 | 0.8 | 13.24052 |

FIG. 7

| Incident angle | Red (635 nm) | Green (532 nm) | Blue (405 nm) |
|---|---|---|---|
| 4° |  |  |  |
| 7° |  |  |  |
| 11° |  |  |  |
| 13° |  |  |  |

| Number of channels in WDM | SDM channel increment | Channel increment with OAM |
|---|---|---|
| 40 | 40*5= 200 channels | 2*200 = 400 channels |
| 80 | 80*5= 400 channels | 2*400 = 800 channels |
| 160 | 160*5=800 channels | 2*800=1600 channels |
| 192 | 192*5 = 960 channels | 2*960= 1920 channels |
FIG. 14A
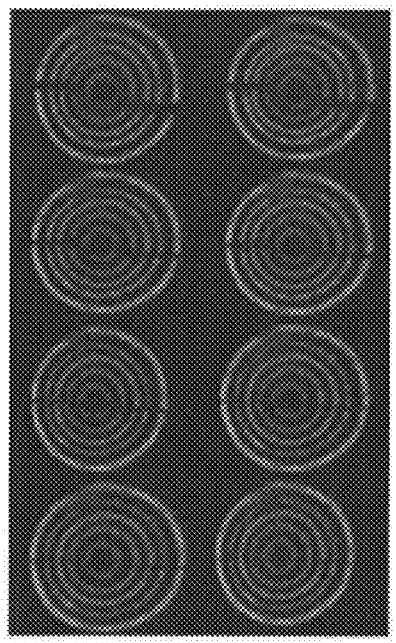
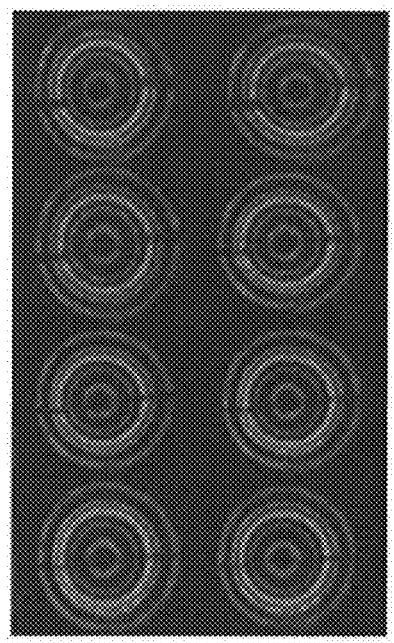
FIG. 14B     FIG. 14C

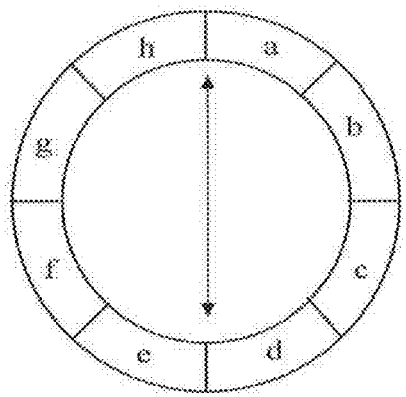
FIG. 15A
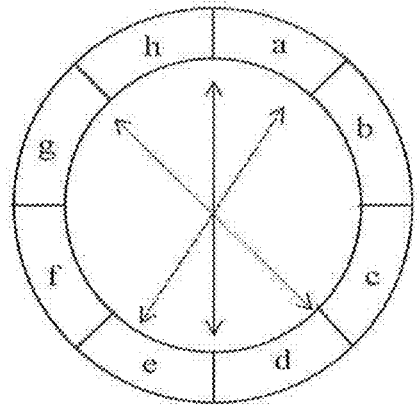
FIG. 15B
| Channel | a | b | c | d | e | f | g | h |
|---|---|---|---|---|---|---|---|---|
| All on | 1 | 1 | 1 | 1 | 1 | 1 | 1 | 1 |
| All off | 0 | 0 | 0 | 0 | 0 | 0 | 0 | 0 |
| CW OAM | 0 | 1 | 1 | 1 | 0 | 1 | 1 | 1 |
| CCW OAM | 1 | 1 | 1 | 0 | 1 | 1 | 1 | 0 |
| All on +CW OAM | 1 | 1+ | 1+ | 1+ | 1 | 1+ | 1+ | 1+ |
| All on + CCW OAM | 1+ | 1+ | 1+ | 1 | 1+ | 1+ | 1+ | 1 |
| (CW+CCW) OAM | 1 | 1+ | 1+ | 1 | 1 | 1+ | 1+ | 1 |
| All on + (CW+CCW) OAM | 1+ | 1+ | 1+ | 1+ | 1+ | 1+ | 1+ | 1+ |
FIG. 16

METHOD AND APPARATUS FOR MULTIPLEXED OPTICAL COMMUNICATION SYSTEM USING SPATIAL DOMAIN MULTIPLEXING (SDM) AND ORBITAL ANGULAR MOMENTUM OF PHOTON (OAM) MULTIPLEXING WITH WAVELENGTH DIVISION MULTIPLEXING (WDM)

NON-PROVISIONAL APPLICATION FOR PATENT UNDER 35 USC 111(a)

CROSS REFERENCE TO RELATED APPLICATIONS AND INCORPORATION BY REFERENCE

This non-provisional application for patent claims the benefit of priority to, and is a non-provisional application of, U.S. provisional patent application Ser. No. 62/113,060, filed in the United States Patent and Trademark Office (USPTO) on Feb. 6, 2015, which is incorporated herein in its entirety by reference. U.S. Pat. No. 8,396,371 to Murshid, et al. titled ORBITAL ANGULAR MOMENTUM IN SPATIALLY MULTIPLEXED OPTICAL FIBER COMMUNICATIONS, which issued Mar. 12, 2013 from the United States Patent and Trademark Office (USPTO), is herein incorporated by reference in its entirety. U.S. Pat. No. 7,639,909 to Murshid et al., METHOD AND APPARATUS FOR SPATIAL DOMAIN MULTIPLEXING IN OPTICAL FIBER COMMUNICATIONS, which issued Dec. 29, 2009 from the USPTO is herein incorporated by reference in its entirety. U.S. Pat. No. 7,174,067 to Murshid et al., METHOD AND APPARATUS FOR SPATIAL DOMAIN MULTIPLEXING IN OPTICAL FIBER COMMUNICATIONS, which issued Feb. 6, 2007 from the USPTO, is herein incorporated by reference in its entirety. All patents, patent applications, provisional applications, and publications referred to or cited herein are each incorporated by reference in their entirety, including all figures and tables, to the extent they are not inconsistent with the explicit teachings of this specification.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

FIELD OF THE INVENTION

The present disclosure relates to the field of optical communication systems including fiber optic communication systems. More specifically, the field of the invention relates to optical fiber communication systems comprising multiple-input-multiple-output (MIMO) architectures employing a combination of modulation techniques, including orbital angular momentum (OAM) of photons, spatial domain multiplexing (SDM) and wavelength division multiplexing (WDM).

BACKGROUND

Multiplexing is a method by which multiple channels of analog or digital data are combined on placed into a single shared media at the input end of the media. The media may be any communication media, such as, for example, an optical fiber. De-multiplexing is a method by which multiplexed signals are recovered from the shared media and separated into individual channels at the receiving end of the media. Optical multiplexing systems bring distinctive advantages over traditional non-optical systems. These advantages include significant bandwidth increase and higher data transmission rates. Multiplexing techniques in optical communications include, among others, time division multiplexing (TDM) wavelength division multiplexing (WDM), dense wavelength division multiplexing (DWDM), orbital angular momentum (OAM) multiplexing, spatial domain (or space division) multiplexing (SDM), time division multiplexing (TDM), and polarization division multiplexing (PDM).

TDM is a method for combining two or more separate streams of data, which may be digital data or analog data, for communication over a common channel, which may be for example a single optical fiber. In TDM, the incoming separate streams of data are divided into segments or packets which may be of equal or predetermined length. The packets may be encoded, encrypted, or otherwise manipulated for data integrity and security reasons. The packets containing data from the incoming separate streams of data are interleaved in time by the TDM multiplexer, resulting in a multiplexed data stream that contains packets of data from the incoming separate streams of data which are interleaved in time. After multiplexing, the multiplexed data signal is transmitted over a shared communication medium, such as an optical fiber, where it is received by a receiver. The multiplexed data signal is demultiplexed on the receive, or output end of the shared communication medium. The packets for each incoming separate streams of data are recovered from the multiplexed data signal and reassembled into their original format to recreate each original incoming separate streams of data.

WDM, illustrated in FIG. 1, allows simultaneous propagation of independent channels of different optical wavelengths (or, in other words, colors) into a single optical fiber. Those channels are multiplexed and launched into the optical fibers at the input end. On the receiving end of the fiber, a wavelength division de-multiplexer separates the signals based on each individual channel wavelength. Optical filters, such as fiber-based Bragg Gratings, are typically used for this purpose in conjunction with photo-detectors to demultiplex WDM signals into individual communication channels. A fiber Bragg grating (FBG) is a type of distributed Bragg reflector constructed in a short segment of optical fiber that reflects particular wavelengths of light and transmits all others. This is achieved by creating a periodic variation in the refractive index of the fiber core, which generates a wavelength-specific dielectric mirror. A fiber Bragg grating can therefore be used as an inline optical filter to block certain wavelengths, or as a wavelength-specific reflector for use as a WDM demultiplexer.

In OAM multiplexing, two different orthogonal electromagnetic waves are multiplexed onto a single optical communication channel using two independent and different orbital angular momentums of the same azimuthal index. This momentum can be either clockwise (CW) or counter clockwise (CCW). Based on the azimuthal index, OAM can be detected using, among other techniques, a ridge-based segmented circular detector, such as the one shown in FIG. 15A. The structure and method for using a ridge-based segmented circular detector is described in U.S. Pat. No. 8,396,371, which is hereby incorporated by reference in its entirety.

SDM utilizes a MIMO configuration to increase the data capacity of optical fibers. The data carrying capacity of a standard optical fiber increases as helically propagating non-meridional SDM channels allow spatially separated channels to reuse optical frequencies within an optical fiber. SDM has been successfully tested up to several kilometers. It allows multiple channels of the same optical wavelength to propagate inside a single multimode carrier optical fiber (which may be, for example, 62.5/125 μm). Concentric donut shape rings, one ring for each independent channel, are generated at the output end of the system due to helical propagation of light while traversing the length of the fiber. A spatial domain de-multiplexer having photodetectors spatially arranged so that at least one photodetector, or a plurality of photodetectors, is individually illuminated by each of the independent concentric rings is used to separate the individual SDM output channels. Thus, each ring emitted from the receiving, or output, end of the optical fiber illuminates a specific photodetector, or plurality of photodetectors, for converting each ring into an independent channel of electrical data. As shown in FIG. 2, a typical SDM system includes a plurality of optical sources, such as single-mode pigtail laser sources of a given wavelength, a beam combiner module (BCM) or spatial multiplexer, a standard step index multimode carrier fiber, a beam separator module (BSM) or spatial de-multiplexer and photo detectors to detect the different channels. In use, light from multiple single-mode pigtail laser sources of the same wavelength is launched into a carrier multimode step index fiber at an angle specific to each source. The launching angles determine the output angles of the light at the output end of the carrier fiber. Each spatially separated optical channel launched into the fiber follows a separate helical trajectory while traversing the length of the carrier fiber thereby allowing multiple spatially separated optical communication channels of the same wavelength to exist simultaneously in the fiber; in other words, allowing spatial reuse of optical frequencies. Light is launched from multiple single-mode pigtail optical sources, such as lasers, at different angles (with respect to the longitudinal axis of the carrier fiber) into the carrier fiber. Free space, few mode and multimode fiber based laser sources have also been successfully used. Due to helical propagation, distinct concentric donut-shaped rings, one ring for each independent channel, with no discernible cross talk are produced at the receiving end of the fiber. Each ring is detected for the recovery of data in that specific channel.

These SDM channels can also exhibit OAM thereby adding an extra degree of photon freedom. An SDM system can operate at different wavelengths without changing its radial distribution.

SUMMARY OF THE INVENTION

In accordance with the teachings disclosed herein, a hybrid optical fiber communications architecture is disclosed. By "hybrid", it is meant that the invention comprises more than a single modulation modality. Thus, an embodiment of the invention comprises WDM and SDM signals or WDM, SDM and OAM signals in a single optical fiber. In the embodiment of the invention comprising SDM, OAM and WDM in a single optical fiber, two new degrees of photon freedom are added to optical communication channels for light energy propagating within the optical fiber, with the potential to increase the bandwidth of an optical fiber communication system by an order of magnitude or greater without increasing the number of optical fibers. In various embodiments the invention may comprise TDM multiplexing of baseband signals prior to input into the SDM multiplexer; or independent input baseband signals may be input directly into the SDM multiplexer.

BRIEF DESCRIPTION OF THE DRAWINGS

FIG. 6 is a table of the input and output angle correlations for different launching angles of green light (wavelength=532 nm) according to an embodiment of the present invention.

FIG. 7 is a table of the input and output angle correlations for different launching angles of blue light (wavelength=405 nm) according to an embodiment of the present invention.

FIG. 14A is a table comparing the channels of the prior art WDM model and embodiments of the present invention.

FIG. 14B is an image showing a 5-channel clockwise OAM at a wavelength of 635 nm according to an embodiment of the present invention.

FIG. 14C is an image showing a 5 channel counter clockwise OAM at a wavelength of 635 nm according to an embodiment of the present invention.

FIGS. 15A and 15B are diagrams of a ridge-based segmented detector to detect OAMs according to an embodiment of the present invention.

FIG. 16 is truth table for the ridge-based segmented detector shown in FIGS. 15A and 15B according to an embodiment of the present invention.

DETAILED DESCRIPTION OF THE PREFERRED EMBODIMENTS

A detailed description of the embodiments of a hybrid optical fiber communications architecture will now be presented with reference to FIGS. 2A through 22C. One of skill in the art will recognize that these embodiments are not intended to be limitations on the scope, and that modifications are possible without departing from the spirit thereof. In certain instances, well-known methods, procedures, components, and circuits have not been described in detail.

As used herein and in the appended figures, "Mux" means multiplexer.

As used herein and in the appended figures, "Demux" means demultiplexer.

As used herein, "optical fiber" and "fiber" means any optically transmissive waveguide, which includes but is not limited to multimode, single mode, step index, graded index optical fibers, and hollow core fibers.

Figure 1A:
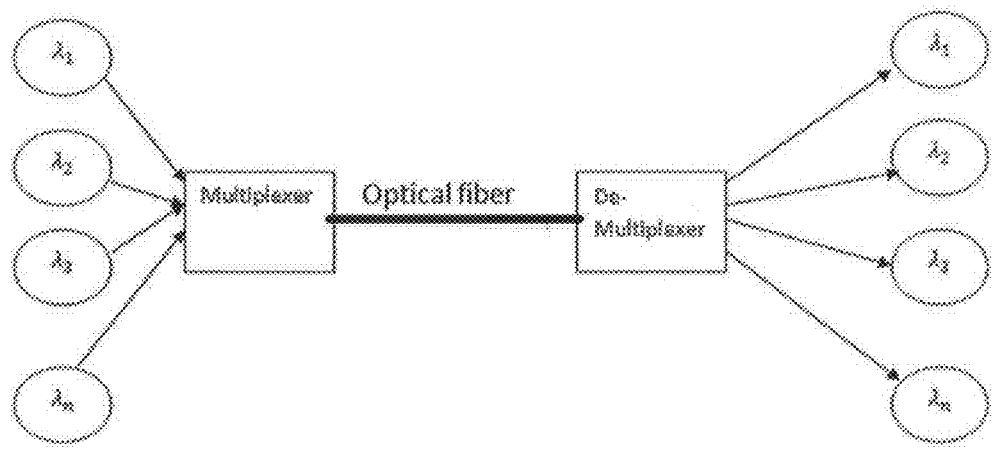
FIG. 1A is a block diagram of a known WDM system.
Figure 1B:
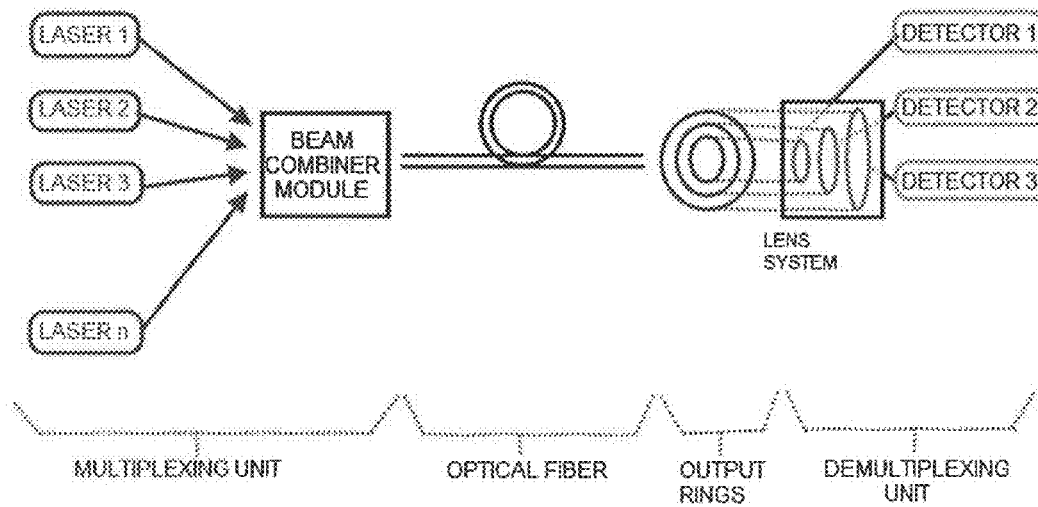
FIG. 1B is a block diagram of a known SDM system.
Figure 2A:
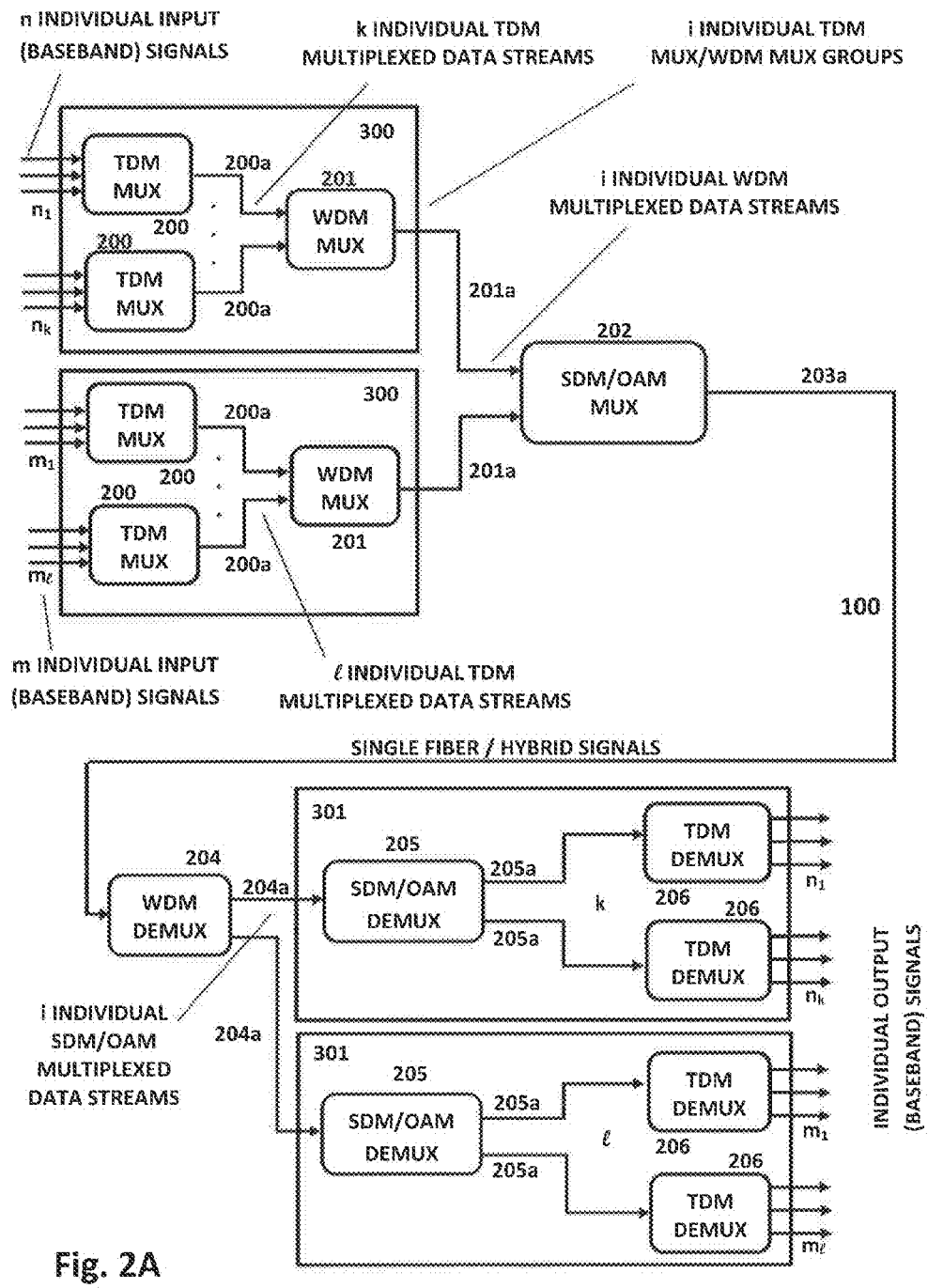
FIG. 2A is a block diagram of an embodiment of the invention in which the hybrid optical fiber communications architecture of the invention comprises TDM, WDM, SDM and OAM in a single optical fiber.

Referring now to FIG. 2A, a block diagram of an embodiment of the invention in which the hybrid optical fiber communications architecture of the invention comprises TDM, WDM, SDM and OAM in a single fiber is depicted. The apparatus and method of the invention may comprise at least one, but preferably a plurality i of WDM multiplexers 201, each in communication with a plurality of TDM multiplexers 200, forming a TDM Mux/WDM Mux group 300. There may be any quantity i of TDM Mux/WDM Mux groups 300. In the exemplary embodiment depicted in FIG. 2A two TDM Mux/WDM Mux groups 300 are depicted; that is to say, for the embodiment shown i=2. A first TDM Mux/WDM Mux group 300 comprises k TDM multiplexers, and a second TDM Mux/WDM Mux group 300 comprises l TDM multiplexers. At least one, but preferably a plurality, of individual input baseband signals, which are separate streams of data and may be of any quantity, are input to each TDM multiplexer 200. Each TDM multiplexer 200 interleaves data packets from each of the individual input baseband signals into a single TDM multiplexed data stream 200a as hereinbefore described. The system may comprise a plurality of k TDM multiplexers, each in communication with its own group of individual input baseband signals, and each producing a single TDM multiplexed data stream 200a, resulting in k individual TDM multiplexed data streams 200a.

Figure 3A:
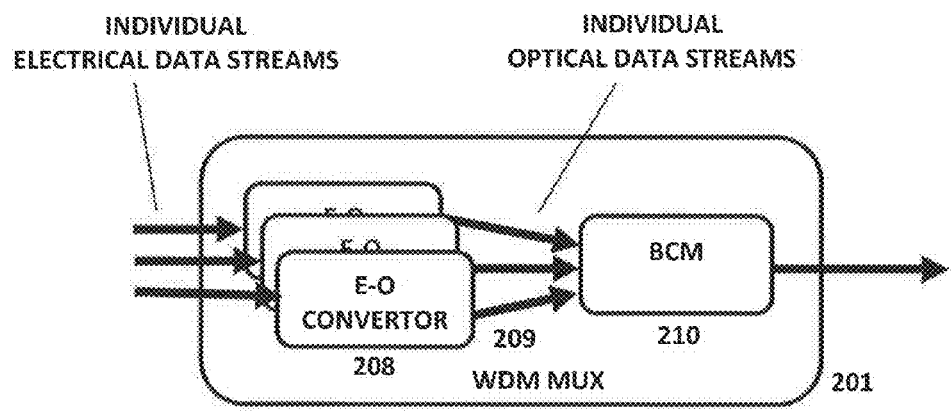
FIG. 3A is a block diagram of a WDM multiplexer comprising electrical to optical convertors, which may be for example laser transmitters, and a Beam Combiner Module for combining a plurality of optical signals of unique wavelength onto a single optical fiber.

Still referring to FIG. 2A and also referring to FIG. 3A, each of the individual TDM multiplexed data streams 200a may be input to a WDM mux, or multiplexer, 201, which may comprise at least one but preferably a plurality of electrical-to-optical convertors 208 which may be, for example, laser transmitters, and wherein each of the electrical-to-optical convertors receives one of the individual TDM multiplexed data streams 200a and produces an optical signal in an output optical fiber 209, the output optical signal of each electrical-to-optical convertor 208 being of an optical wavelength different from each of the other electrical-to-optical convertors 208 which are combined into a single Beam Combiner Module (BCM). In this manner a plurality of optical signals is produced in each electrical-to-optical convertor output optical fiber 209, each optical signal from each electrical-to-optical convertor 208 of differing wavelength and each representing a TDM multiplexed data stream comprising interleaved data packets from a TDM multiplexer 200. Each of the optical signals 209 produced by the electrical-to-optical convertors 208 is combined into a single combined WDM optical signal 201a using an optical combiner, or Beam Combiner Module, 210, the single combined WDM optical signal 201a comprising each of the optical signals carried by optical fibers 209 produced by the electrical-to-optical convertors 208. As an example, the electrical-to-optical convertors 208 in optical communication with a single BCM may comprise a laser with a red optical output, a laser with a blue optical output, and a laser with a green optical output. Electrical-to-optical convertors 208 may emit visible light, but this is not necessary. As an example, a laser utilized as an electrical-to-optical convertor 208 may operate in the infrared or any other wavelength.

Still referring to FIG. 2A, one or more WDM optical signals 201a may be launched into an optical fiber by SDM/OAM Mux 202 in such a manner as to generate at least one or a plurality of helically propagating optical signals that are optically isolated by SDM and OAM as described further herein, and also as are described in U.S. Pat. Nos. 7,174,067 7,639,909 and 8,396,371, which are each incorporated herein by reference in their entirety.

Optical fiber 100 may be of any length, and is characterized in part by having a longitudinal axis. The optical signals 203a launched into optical fiber 100 may be launched at specific angles relative to the longitudinal axis so as to generate propagating SDM/OAM optical signals. Thus the optical signal carried by optical fiber 100 may comprise TDM, WDM and SDM/OAM signals, resulting in a fiber optic communication channel exhibiting a significant improvement in bandwidth over systems of the prior art.

Still referring to FIG. 2A, optical fiber 100 may be in optical communication with WDM demux 204 which may be, for example, a Bragg grating or plurality of Bragg gratings which operate to reflect or split optical wavelengths that correspond to the optical wavelengths of the electrical-to-optical convertors 208. WDM demultiplexer 204 may comprise a Bragg grating for each electrical-to-optical convertor wavelength. The WDM demultiplex operation outputs i individual optical signals, carried preferably via optical fiber 204a, to SDM/OAM demultiplexers 205. Thus, after isolating the desired optical wavelengths, the optical signals from the WDM demux are input to an SDM/OAM demultiplexer as described further herein and in U.S. Pat. No. 8,396,371. The SDM/OAM demultiplexers comprise optical-to-electrical convertors such as photodiodes or other photodetectors, which output an electrical signal and are in electrical communication with TDM demultiplexers 206. TDM demultiplexers 206 demultiplex the TDM signals to reconstruct the individual input baseband signals. In the example shown, two SDM/OAM demux/TDM demux groups 301 are shown; in the first group a group of k signals are demultiplexed by SDM/OAM demultiplexer 205, and in the second group a group of l signals are demultiplexed by SDM/OAM demultiplexer 205.

In SDM, multiple optical channels of different optical wavelengths can be launched into a multimode optical fiber at different incident angles θ. These incident angles must be within the Numerical Aperture (NA) of the fiber. The optical channels will stay in the same spatial location within the fiber if they are launched at the same incident angle even though their wavelengths are different. The channels can have the same spatial location within the optical fiber but can have different orientation of angular momentum (clockwise and counter-clockwise). The channels are applicable in free space or any fiber (e.g. plastic, polymer, glass, single mode, multimode, hollow core, step index, photonic crystal, etc.).

Figure 2B:
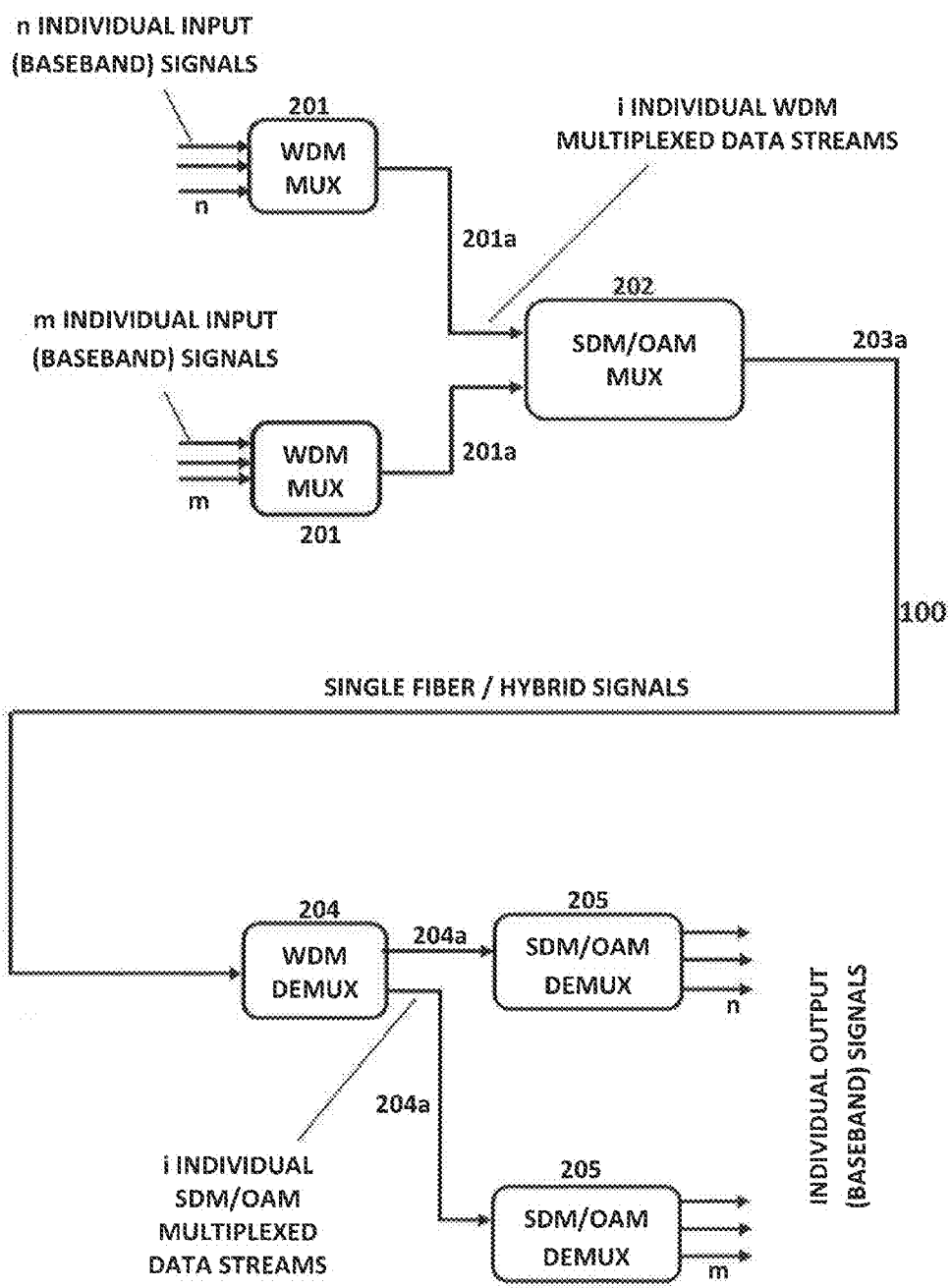
FIG. 2B is a block diagram of an embodiment of the invention in which the hybrid optical fiber communications architecture of the invention comprises WDM, SDM and OAM in a single optical fiber.

Referring now to FIG. 2B, an embodiment of the apparatus and method of the invention without TDM is depicted. In this embodiment, individual input baseband signals are input directly to WDM multiplexers 201, producing i channels of WDM multiplexed optical signals on optical fibers 201a. There are preferably, but not necessarily, more than one channel of WDM multiplexed optical signals on optical fibers 201a, thus i is typically greater than one. WDM multiplexers 201 are in optical communication with SDM/OAM multiplexer 202 in such a manner as to generate at least one, and preferably a plurality, of helically propagating optical signals that are optically isolated by SDM and OAM as described further herein, and also as are described in U.S. Pat. Nos. 7,174,067, 7,639,909 and 8,396,371, which are each incorporated herein by reference in their entirety.

Still referring to FIG. 2B, optical transmission fiber 100 may be in optical communication with WDM demultiplexer 204 which may comprise one or more optical Beam Splitter Modules (BSM) which may be wavelength filters or gratings, such as, for example, a Bragg grating or plurality of Bragg gratings, which operate to reflect or split unique optical wavelengths that correspond to the unique optical wavelengths of the electrical-to-optical convertors 208 of WDM multiplexer 201. WDM demultiplexer 204 may comprise a Bragg grating for each unique electrical-to-optical convertor optical wavelength. The WDM demultiplex operation outputs i individual optical signals, carried preferably via optical fiber 204a, to SDM/OAM demultiplexers 205. Thus, after isolating the desired optical wavelengths, the optical signals from the WDM demux are input to an SDM/OAM demultiplexer as described further herein and in U.S. Pat. No. 8,396,371. The SDM/OAM demultiplexers comprise optical-to-electrical convertors such as photodiodes or other photodetectors, which each output an individual output baseband electrical signal that corresponds to an individual input baseband signal. Optical transmission fiber 100 may be of any length, and is characterized in part by having a longitudinal axis. The optical signals 203a launched into optical fiber 100 may be launched at specific angles relative to the longitudinal axis so as to generate propagating SDM/OAM optical signals. Thus the optical signal carried by optical fiber transmission 100 may comprise WDM and SDM/OAM signals, resulting in a fiber optic communication channel exhibiting a significant improvement in bandwidth over systems of the prior art.

Figure 3B:
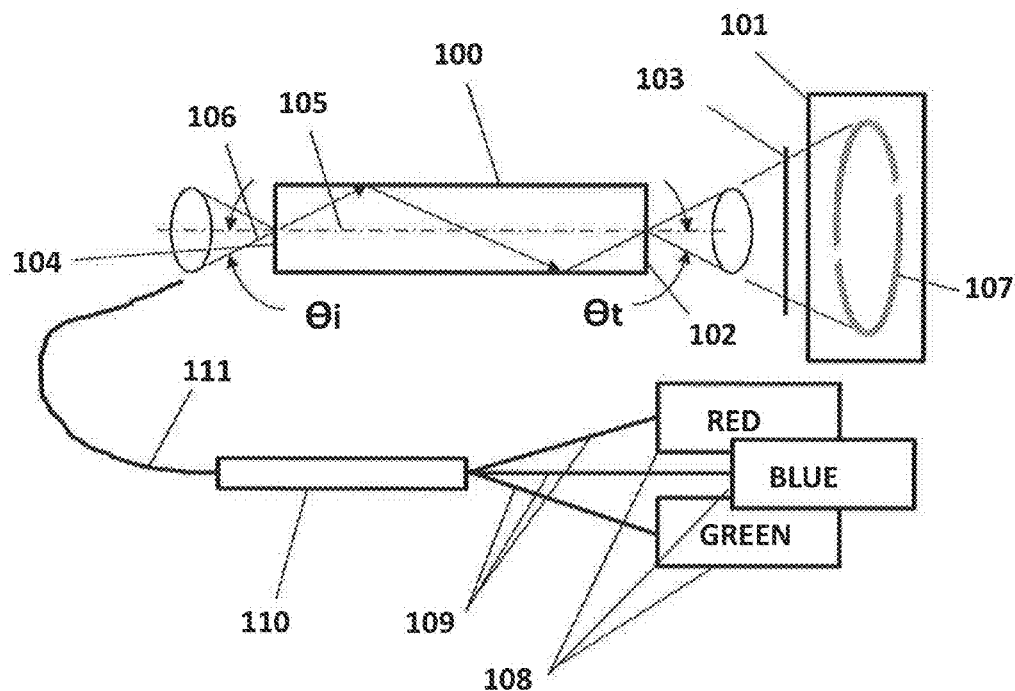
FIG. 3B is a block diagram of an SDM system used to determine OAM at different wavelengths (λ) according to an embodiment of the present invention.

Referring now to FIG. 3B, an experimental setup of the invention used to determine OAM at different wavelengths is depicted. Light 106 from different optical sources such as lasers having different wavelengths 108 and having fiber optic pigtails 109 is combined in beam combiner module 110. Light sources 108 may be any light sources which can couple optical energy onto an optical fiber and thus are not necessarily lasers. Combiner 110 has a fiber optic pigtail 111 carrying combined light signals from lasers 108 as a WDM signal. Light sources 108, fiber optic pigtails 109, optical beam combiner module 110, and fiber optic pigtail 111, in an embodiment, comprise a WDM multiplexer, also depicted in FIG. 3A. The WDM signal propagates along fiber optic pigtail 111 and is launched into a single optical transmission fiber 100 having a first end 104, a second end 102, a length, and a longitudinal axis 105. The launching angle $\theta_i$, which is the angle between the longitudinal axis of the light energy 106 illuminating the input end of the optical fiber 104 and the longitudinal axis of fiber 100 stays the same but the wavelengths differ at the same spatial location. A screen 101 is placed near the output, or receiving, end 102 of fiber 100 and a thin wire 103 is placed between output end 102 of optical fiber 100 and screen 101. Concentric donut-shaped rings 107 of similar radii can be observed on the screen for different optical wavelengths emitted from output end 102. It can be observed from this experiment that OAM allows separation of optical channels created by launching light from a plurality of optical sources having differing wavelengths into the input end 104 of a single fiber 100, in which the launching angle $\theta$ is substantially the same for each source. This experiment demonstrates that SDM can enhance the total communication bandwidth of an OAM system by an order of magnitude as discussed below. As a result, when SDM is added to a WDM system, the WDM channel capacity increases by a factor of 'N', where 'N' is the number of input channels in the SDM system. For example, for a five-channel SDM system (N=5), the optical fiber can carry five times the capacity offered by a single set of WDM channels. The use of SDM and OAM for communicating independent channels of data over a single fiber in the aforementioned manner are described in U.S. Pat. Nos. 7,174,067, 7,639,909 and 8,396,371, which are each incorporated herein by reference in their entirety.

The optical channels can also be launched into an optical transmission fiber at different complimentary angles $\theta_i$ and $\alpha$ where $\theta_i$ and $\alpha$ are measured between the longitudinal axis of the transmitting fiber (see item FIG. 3B, where the longitudinal axis of the transmitting fiber is depicted as item 106) and the longitudinal axis of the optical transmission fiber in which it is desired to launch a plurality of signals with OAM signal separation (this optical fiber is called out as item 105 in FIG. 3B). As a result, both clockwise and counter-clockwise OAM can coexist at the same spatial location within the optical transmission fiber but with opposite topological charges. Despite having the same propagation direction and the same incident angles $\theta_i$, each of the independent optical channels travel in a different optical path inside the optical fiber resulting in OAM separation between them. Therefore, they are spatially separated in the z-direction as illustrated in FIG. 4.

The ability to simultaneously transmit two optical vortices of the same or similar OAM but opposite topological charge inside the fiber while preserving each's OAM provides the ability to transmit two channels at the same spatial location by using OAM in conjunction with intensity of light to detect signals instead of the conventional methods of employing intensity alone to detect the presence or absence of a signal.

Because the SDM channels carry OAM and the complementary input launch conditions can be used to launch two SDM channels at the same spatial location but with opposing OAMs, the five-channel SDM described above can be used to launch ten sets of WDM channels—five with clockwise OAM and another five with counter-clockwise OAM which is illustrated in FIG. 14B and FIG. 14C.

In addition, multiple channels of multiple wavelengths can be transmitted at the same time and occupy the same spatial location but they can be separated based on their optical wavelengths and unique OAM.

The embodiments of the invention described herein add two new degrees of photon freedom to optical communication channels and can therefore increase the bandwidth of an optical fiber communication system by an order of magnitude or greater.

Exemplary Experimental Validation A

Figure 13:
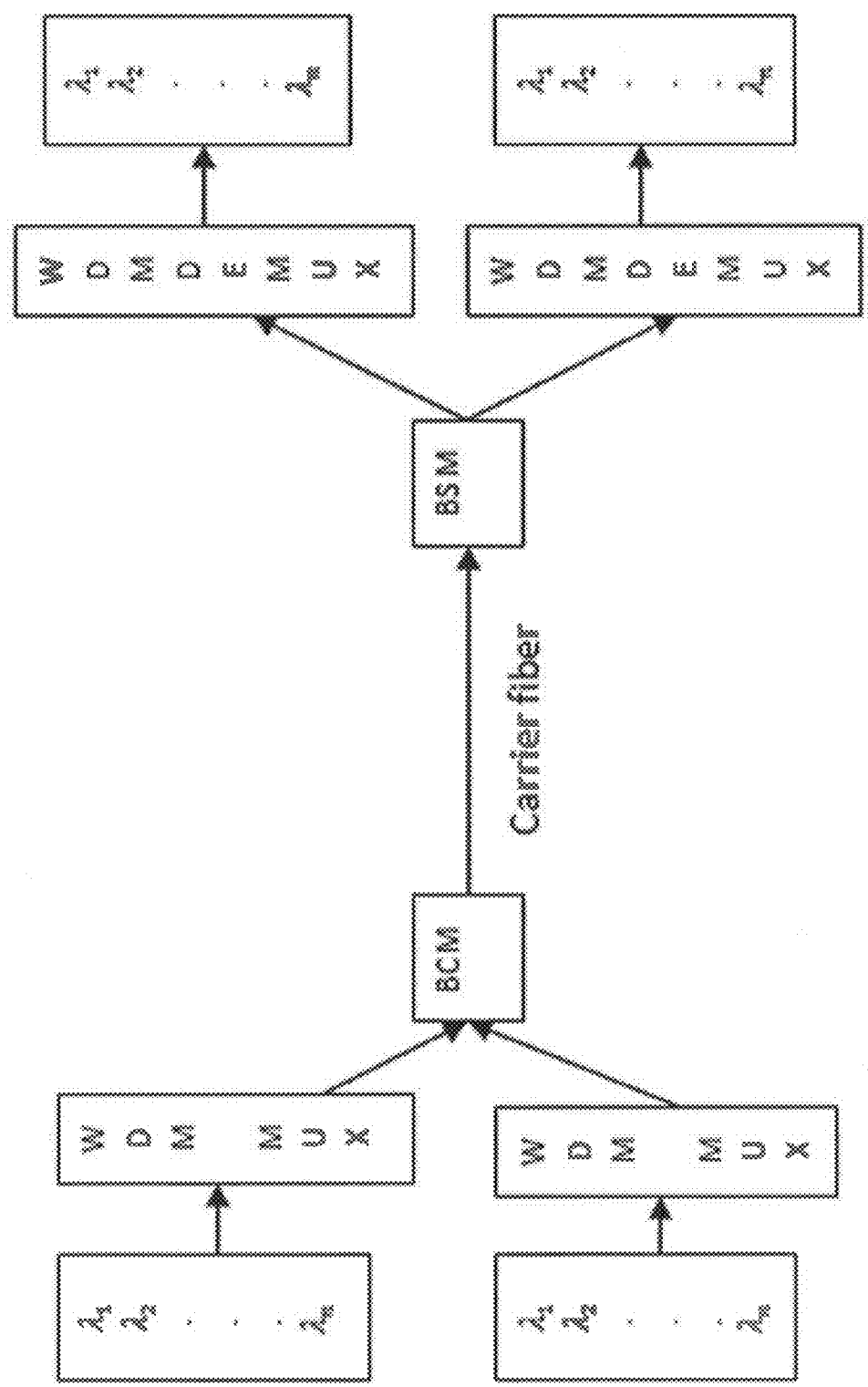
FIG. 13 is a block diagram of an SDM hybrid architecture having WDM according to an embodiment of the present invention.

An embodiment of the invention that comprises a WDM system as well as an SDM system is shown in FIGS. 2A, 2B and 13.

Figures 4A, 4B, 4C, 5:
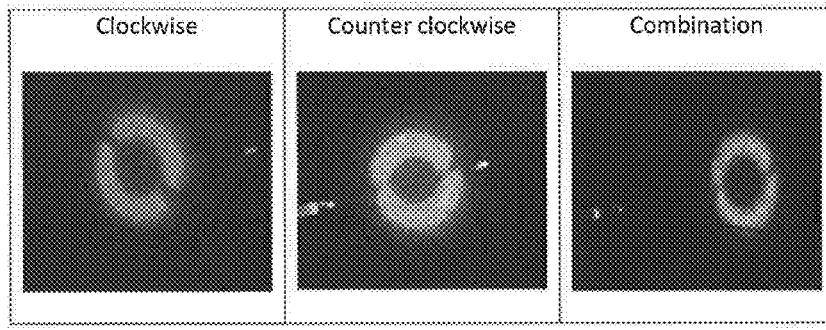
FIGS. 4A-4C are images of the optical field intensity of clockwise OAM for a red laser (FIG. 4A), counter-clockwise OAM for a green laser (FIG. 4B), and the combined clockwise OAM for a red laser and counter-clockwise OAM for a green laser (FIG. 4C) illustrating that the OAM of photons allow two optical communication channels to occupy the same physical location for different wavelengths according to an embodiment of the present invention.
FIG. 5 is a table of the input and output angle correlations for different launching angles of red light (wavelength=635 nm) according to an embodiment of the present invention.

The NA of a fiber does not vary with wavelength. Therefore, according to the fiber geometry, light propagating inside optical fiber will exit the fiber at an angle equal to the incident angle provided that the medium at the input and output ends of the fiber is of the same optical index. In order to experimentally validate this, laser light of three different wavelengths (405 nm, 532 nm, and 635 nm) were launched at a single incident angle. At the output end of the fiber, the location of concentric donut shape rings was carefully measured and it was found that they take the same radial location irrespective of wavelength. Applying the inverse tangent law, transmitted angle is calculated based on the ring radius (r) and the distance of the fiber to screen (L). It was observed that transmitted angles are somewhat similar to the incident angles, which verifies that the outputs of the SDM channels are not affected by wavelength. Therefore, in SDM systems, the transmitted angle of the optical energy exiting the output end of the optical fiber is almost identical to the input angle, irrespective of the optical wavelength. The NA of the fiber remains unchanged and the SDM inputs will follow the same radial distribution. SDM channels are not affected by the wavelength. So, in SDM systems the NA is preserved, because the transmitted angle is almost identical to the input angle. Within the NA, the SDM inputs will follow the same radial distribution. The tables of FIG. 5 through FIG. 7 show the input and output angle correlation for different launching angles at three different wavelengths—635 nm (FIG. 5), 532 nm (FIGS. 6) and 405 nm (FIG. 7).

Figure 8:
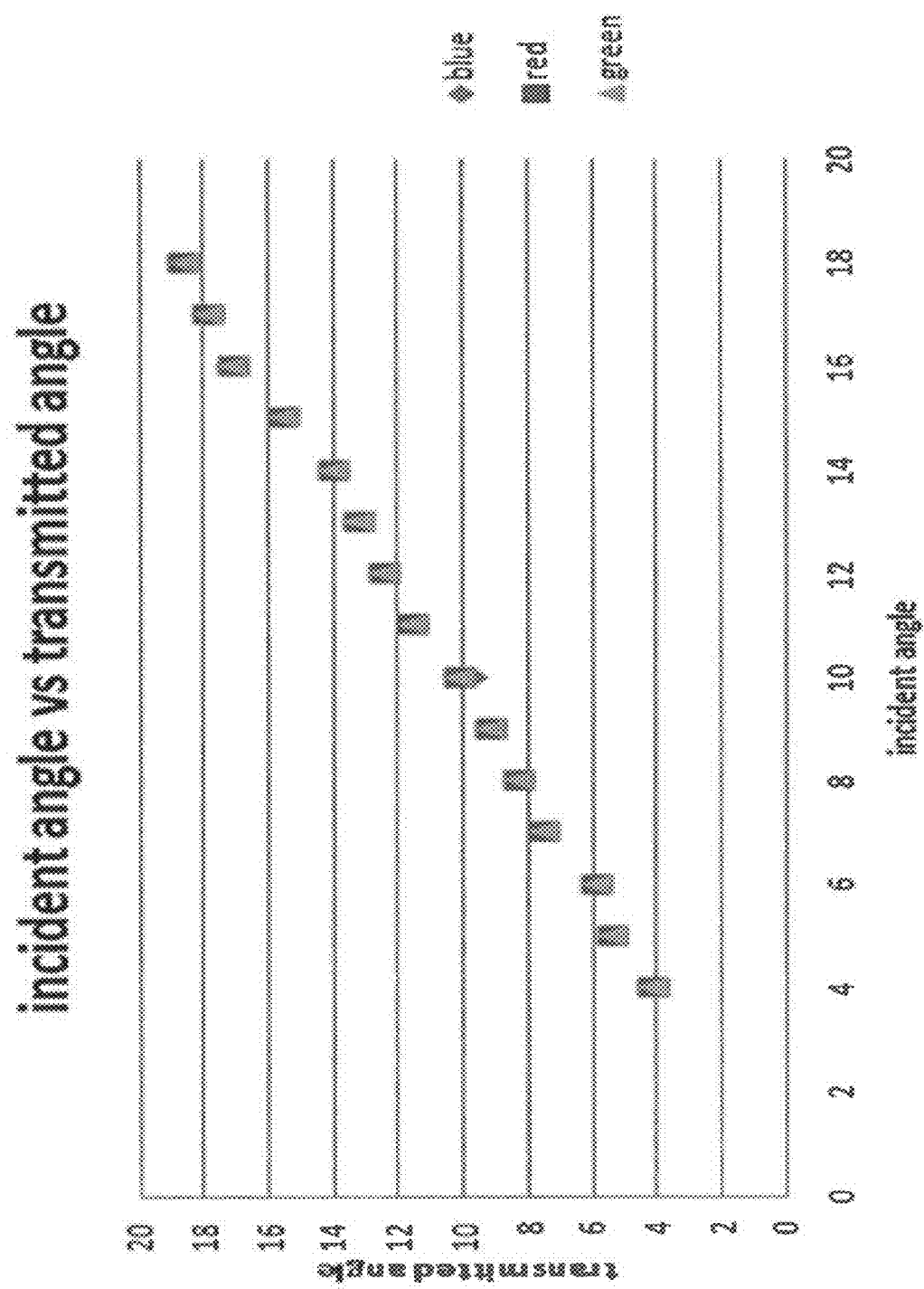
FIG. 8 is a graph of the relationship between the incident angle and the transmitted angle for three different wavelengths according to an embodiment of the present invention.
Figure 9:
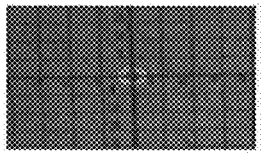
FIG. 9 is a table showing the screen projection of intensity distribution of SDM channels at different wavelengths for different incident angles according to an embodiment of the present invention.
Figure 9:
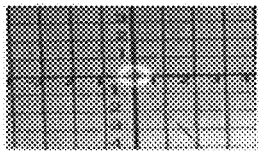
Figure 9:
Figure 9:
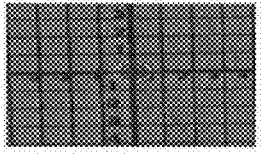
Figure 9:
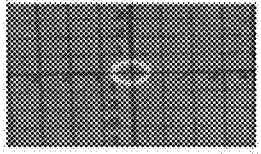
Figure 9:
Figure 9:
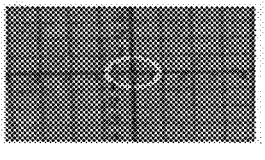
Figure 9:
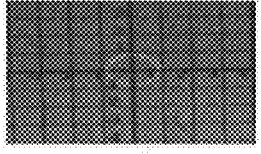
Figure 9:
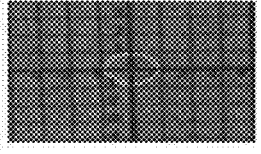
Figure 9:
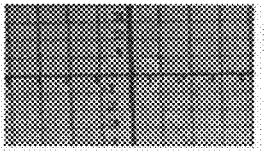
Figure 9:
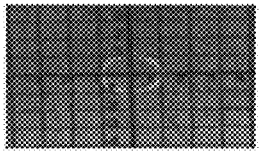
Figure 9:
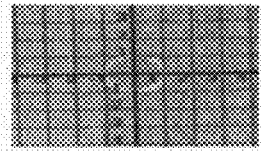
Figure 10:
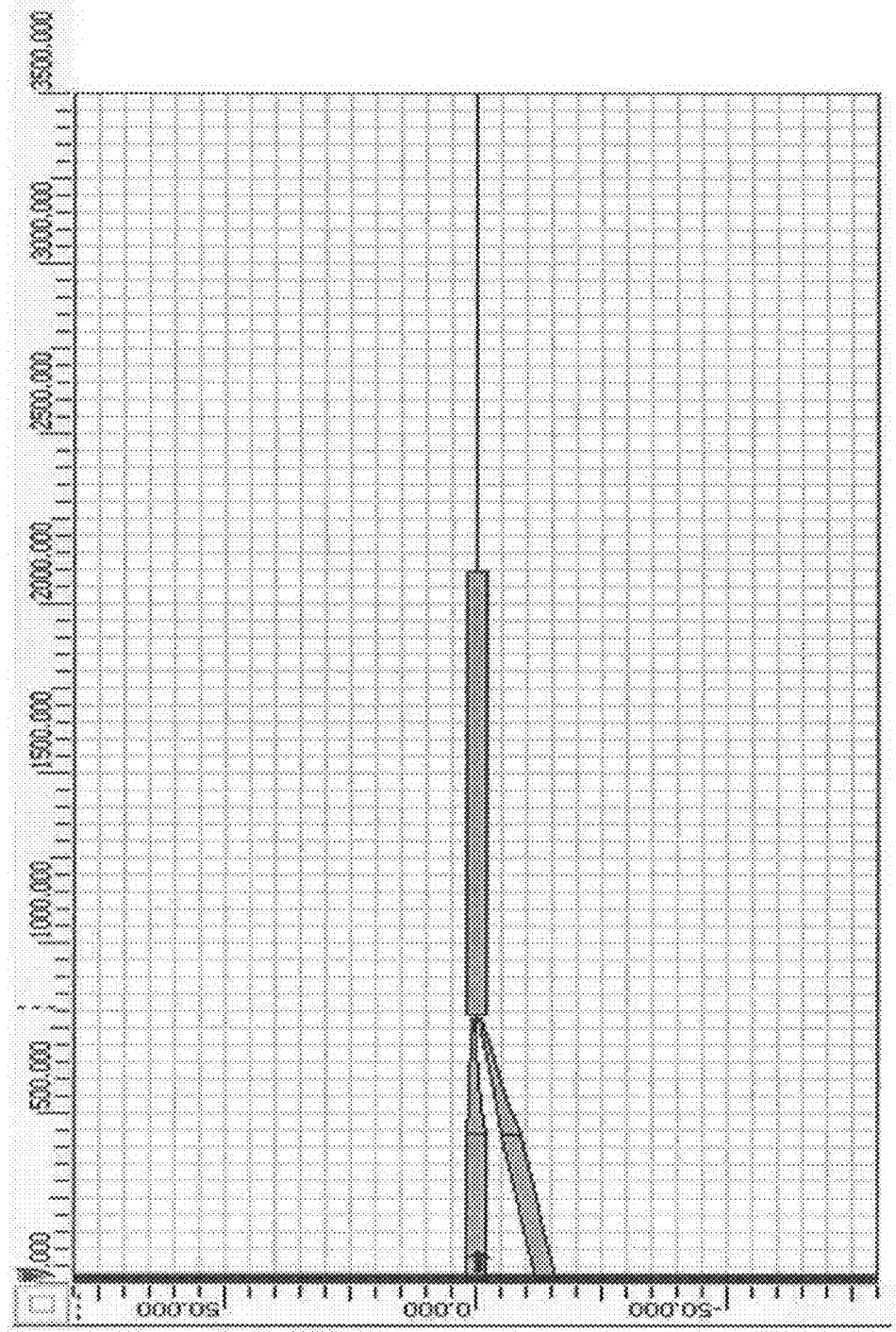
FIG. 10 is a diagram of an OptiBPM™ optical CAD simulation setup according to an embodiment of the present invention.
Figure 11:
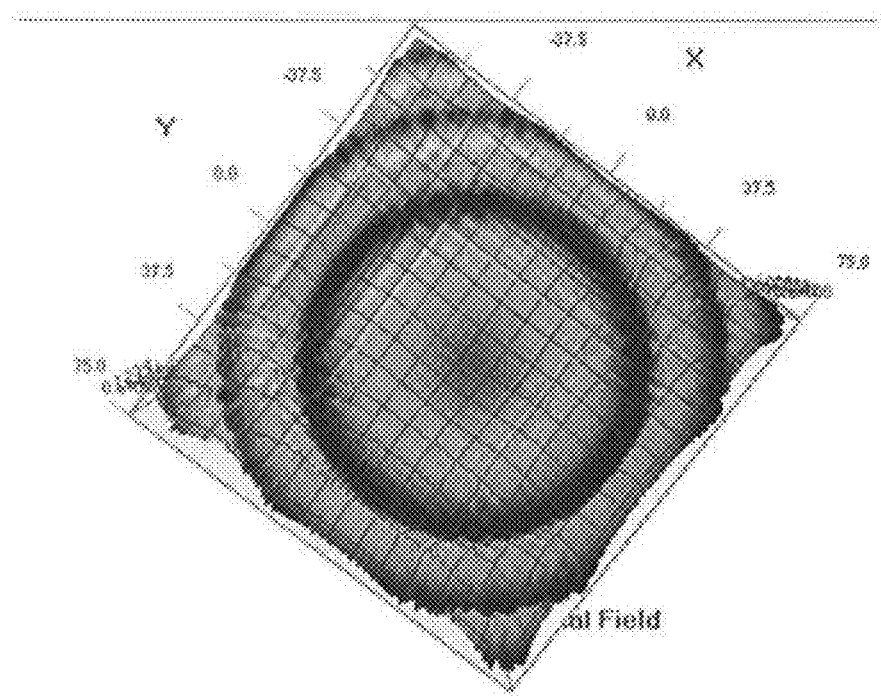
FIG. 11 is a simulated, three-dimensional view of a two-channel SDM output operating at 1530 nm, which was created using the setup shown in FIG. 10, according to an embodiment of the present invention.
Figure 12:
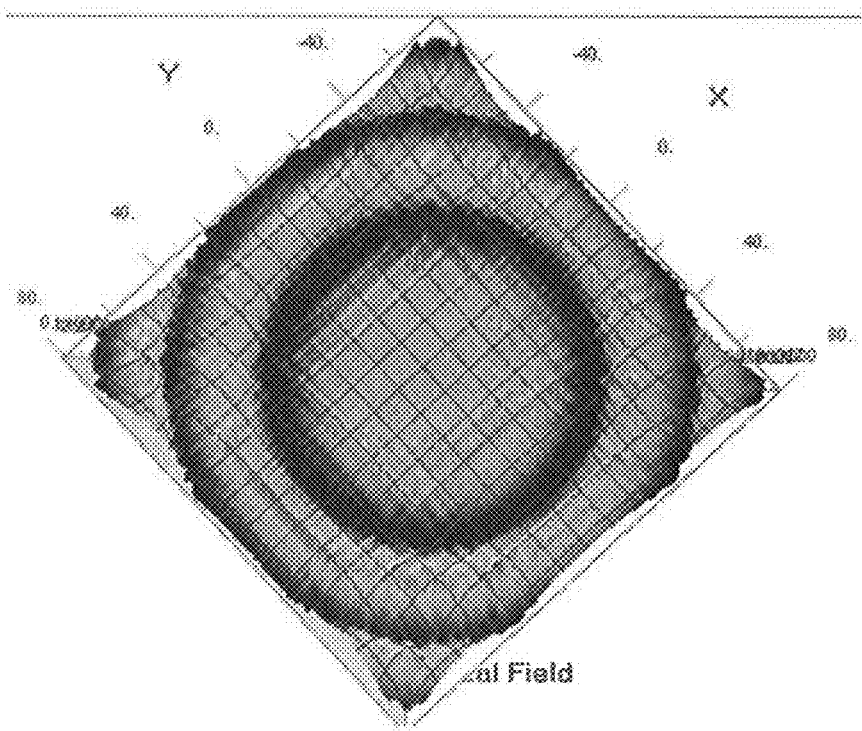
FIG. 12 is a simulated, three-dimensional view of a two-channel SDM output operating at 1565 nm, which was created using the setup shown in FIG. 10, according to an embodiment of the present invention.

FIG. 8 shows the linear relationship between the transmitted angle and the incident angle for three different wavelengths. These values were obtained by analysis of the radial distribution of the SDM channel output results presented in the table of FIG. 9. Simulated results using OptiBPM™ optical CAD simulation software mimicking the experimental setup (operating at 1530 nm and 1565 nm) tend to agree with the experimental results. The CAD setup is presented in FIG. 10, whereas the simulated results are presented in FIGS. 11 and 12.

As described, three different laser sources operating at 405 nm, 532 nm, and 635 nm were used as experimental inputs for an SDM system. The output for all of these wavelengths appeared at the same spatial location. The actual location of the donut-shaped output depended on the input launch angle. Simulated results proved this observation to hold true for 1530 nm and 1565 nm optical wavelengths as well. Therefore, SDM supports broadband sources. It is also possible to launch light sources from multiple sets of narrowband sources using WDM multiplexers and then use an SDM beam combiner module to multiplex them spatially and then launch them over an SDM carrier fiber. These channels will propagate over the carrier fiber with minimal signal degradation and crosstalk and will appear at the output end of the SDM system, where a beam separator unit or the SDM de-multiplexer will route the individual wavelengths/WDM channels to the corresponding photo-detectors. In short, the system presented above allows each SDM donut shaped ring to carry the entire range of WDM channels. As a result, the WDM channel capacity will increase by a factor of 'N', where 'N' is the number of input channels in an SDM system. For example, for a five-channel SDM system (N=5), the fiber can carry five times the capacity offered by a single set of WDM channels which is illustrated in FIG. 14B and FIG. 14C.

As described above, SDM channels carry OAM and the complementary input launch conditions could be used to launch two SDM channels at the same location but with opposing OAMs. Therefore, it is possible to utilize the same five-channel SDM system presented earlier and launch ten sets of WDM channels; five with clockwise (CW) OAM and another five with counter-clockwise (CCW) OAM. The block diagram of such a system is presented in FIG. 13. The output will only be five SDM rings for the ten sets of the combination of SDM and WDM channels; however, the rings can be separated using the opposite OAMs each of the rings carry as hereinbefore described.

As a result, the data capacity of such a system will increase by an order of magnitude. The table of FIG. 14A illustrates the improved channel capacity of such hybrid SDM systems. Experimental results supporting this architecture are presented in the table of FIG. 4.

A detector to detect and demultiplex OAM signals is presented in FIGS. 15A and 15B, where OAM signals with opposite topological charges are detected using a ridge based segmented detector as described in U.S. Pat. No. 8,396,371 to Murshid, et al., which issued Mar. 12, 2013, and which is herein incorporated by reference.

The table of FIG. 16 shows the truth table for the ridge-based segmented detector presented in FIGS. 15A and 15B. This truth table explains how light generated from each segment can be used to detect the counter rotating OAMs.

Column 1 of the table of FIG. 16 shows the eight different possibilities that the light beam falling on any of the eight different segments of the detector could encounter. These include only Standard (channel on), Standard (channel off), only CW OAM, Only CCW OAM, Standard+CW OAM, Standard+CCW OAM, (CW+CCW) OAM, and Standard+(CW+CCW) OAM. The columns 'a' through 'h' show the optical intensity seen by any given segment of this photo-detector. In the table of FIG. 16, '0' signal implies no light, '1' indicates full light and '1+' indicates light from two propagating optical channels (due to clockwise and counter-clockwise OAM bearing SDM channels) on the respective photo detector.

Exemplary Experimental Validation B

Figure 17:
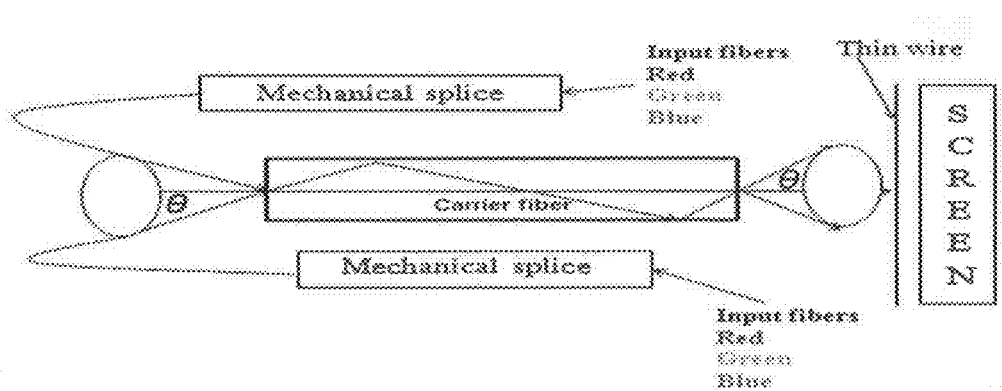
FIG. 17 is a block diagram of a WDM and OAM based SDM system according to an embodiment of the present invention.
Figure 18:
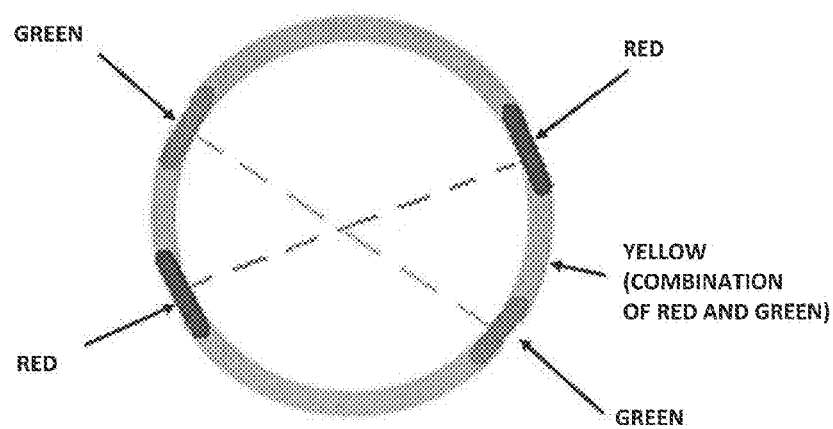
FIG. 18 is a diagram of the screen projection of the output pattern from the WDM and OAM-based SDM system shown in FIG. 17 according to an embodiment of the present invention.

An embodiment of the invention that comprises a WDM system as well as both SDM and OAM systems is shown in FIG. 17. Two single-mode pigtail laser sources operating at different wavelengths are launched into a carrier multimode fiber at complementary angles. These inputs travel helically inside the optical fibers and create donut shaped concentric rings of same radii at the output end of the fiber due to complementary launch angles. The system's projected output patterns are shown in FIG. 18. These SDM channels carry orbital angular momentum, which could be either clockwise (CW) or counter clockwise (CCW) in direction. The invention may comprise any optical fiber. For purposes of verification, different types of step index multimode silica and plastic fibers, ranging from 62.5/124 µm to 1000/1250 µm, have been successfully used to implement this architecture. However these exemplary verification embodiments are not exhaustive of the index profile or core/cladding dimensions.

Figure 19A:
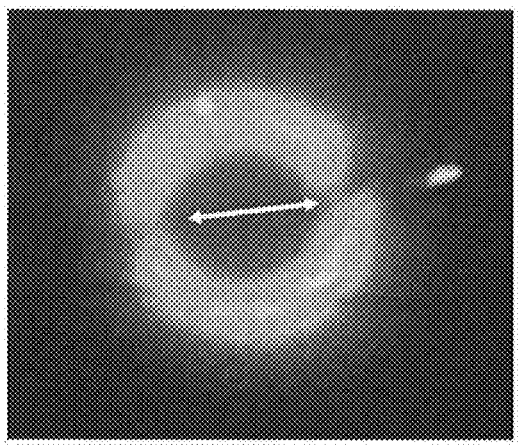
FIG. 19A is an image of the optical field intensity exiting a 1000 μm multimode step index fiber representing a counter-clockwise OAM for a green laser (532 nm) at an input angle of 10° according to an embodiment of the present invention.
Figure 19B:
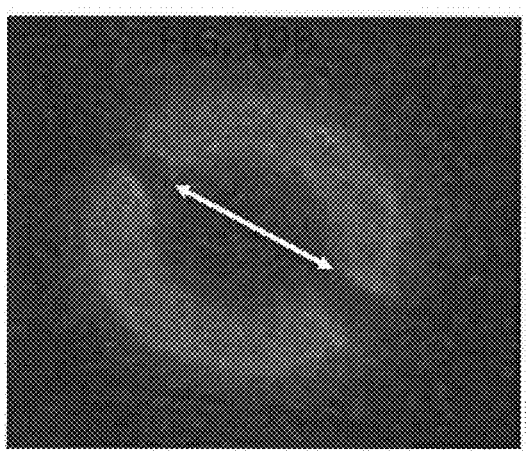
FIG. 19B is an image of the optical field intensity exiting a 1000 μm multimode fiber representing a clockwise OAM for a red laser (635 nm) at an angle complementary to the angle of the green laser of FIG. 19A according to an embodiment of the present invention.
Figure 19C:
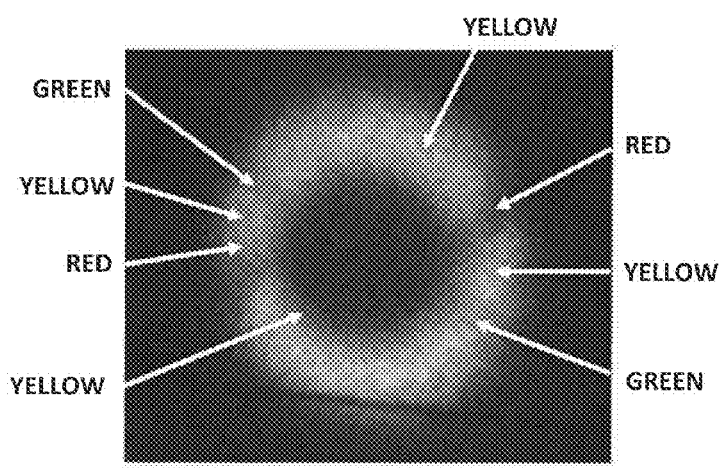
FIG. 19C is an image of the combination of both the counter-clockwise OAM of FIG. 19A and the clockwise OAM of FIG. 19B where the yellow lights represents the presence of both red and green lasers, the green stripes represent the absence of red light and the red stripes represent the absence of green light according to an embodiment of the present invention.

The optical field intensities exiting the output end of 1000 µm step index multimode fiber are depicted in FIGS. 19A-19C. FIG. 19A represents counter-clockwise OAM for a green laser (532 nm) launched at an input angle of 10° while FIG. 19B represents clockwise OAM for red laser (635 nm) at a complementary angle. The twisted shadow of the thin wire is indicated by arrows. FIG. 19C shows the combination of both clockwise and counter-clockwise OAM where the yellow light represents the presence of both red and green lasers. The green stripes represent the absence of red light due to the twisted shadow of clockwise OAM and the red stripes represent the absence of green light due to the twisted shadow of counter-clockwise OAM. The hybrid optical fiber architecture combines the OAM of photons and SDM with WDM adding two new degrees of optical communication channel separation to existing optical fiber multiplexing techniques.

Figure 20A:
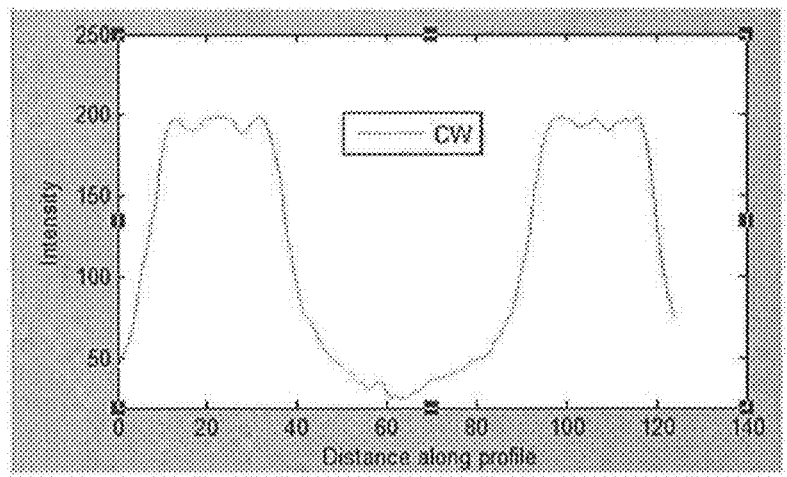
FIG. 20A is a graph showing the intensity profile of the green, counter-clockwise channel for the 1000 μm multimode step index fiber according to an embodiment of the present invention.
Figure 20B:
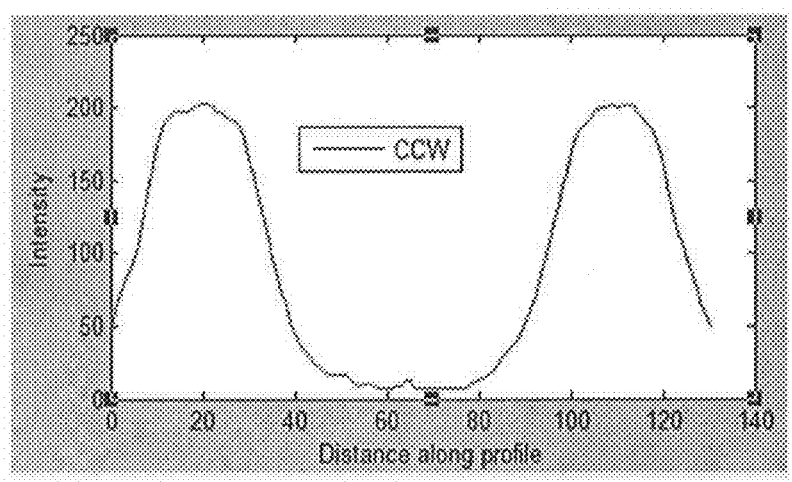
FIG. 20B is a graph showing the intensity profile of the red, clockwise channel for the 1000 μm multimode step index fiber according to an embodiment of the present invention.
Figure 20C:
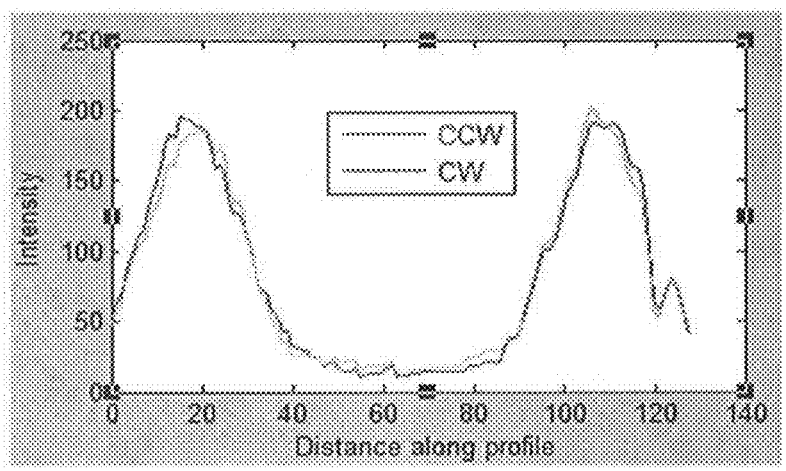
FIG. 20C is a graph showing the intensity profile of the superposition of the green, counter-clockwise channel and the red, clockwise channel for the 1000 μm multimode step index fiber according to an embodiment of the present invention.
Figure 21A:
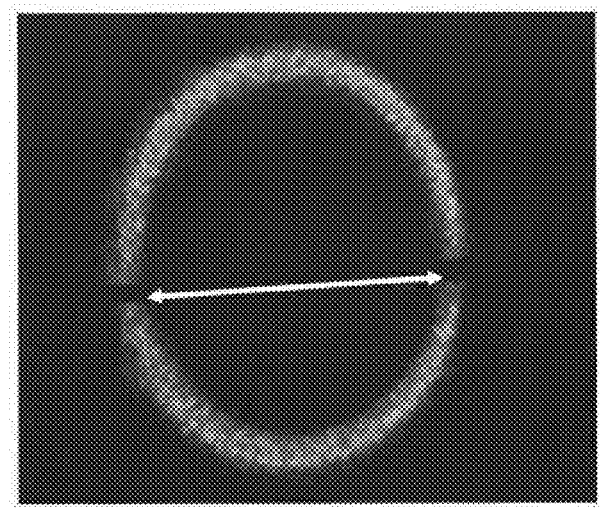
FIG. 21A is an image of the optical field intensity exiting a 62.5/125 μm multimode fiber representing a counter-clockwise OAM for a green laser according to an embodiment of the present invention.
Figure 21B:
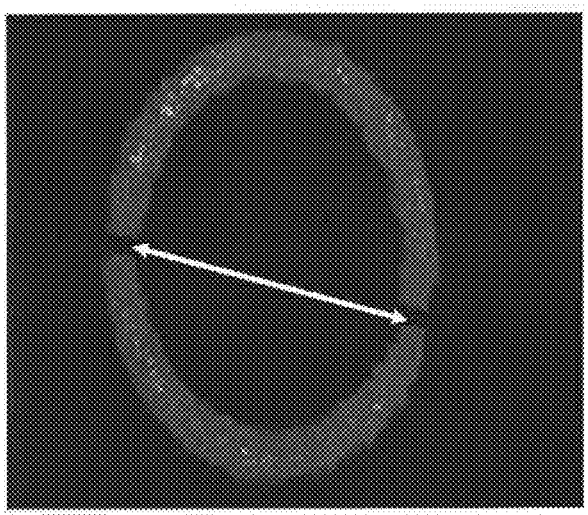
FIG. 21B is an image of the optical field intensity exiting the same multimode fiber of FIG. 21A representing a clockwise OAM for a red laser at an angle complementary to the angle of the green laser of FIG. 21A according to an embodiment of the present invention.
Figure 21C:
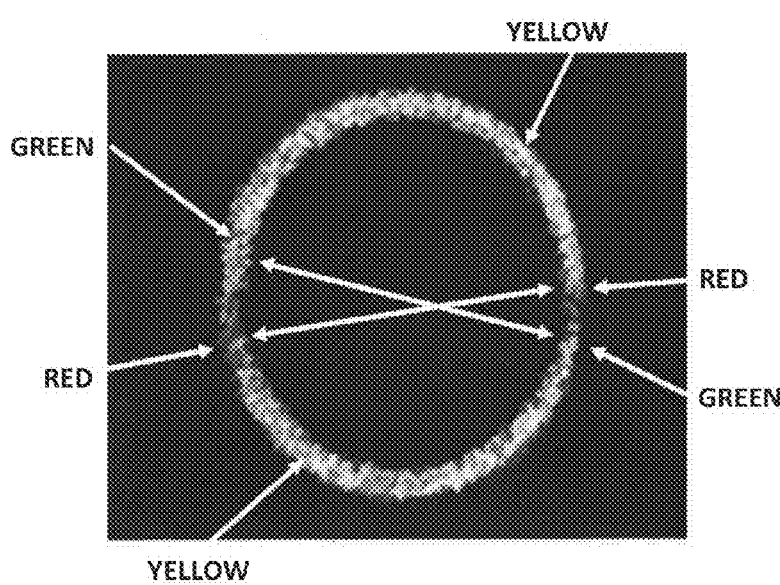
FIG. 21C is an image of the combination of both the counter-clockwise OAM of FIG. 21A and the clockwise OAM of FIG. 21B where the yellow light represents the presence of both red and green lasers, the green stripes represent the absence of red light, and the red stripes represent the absence of green light according to an embodiment of the present invention.
Figure 22A:
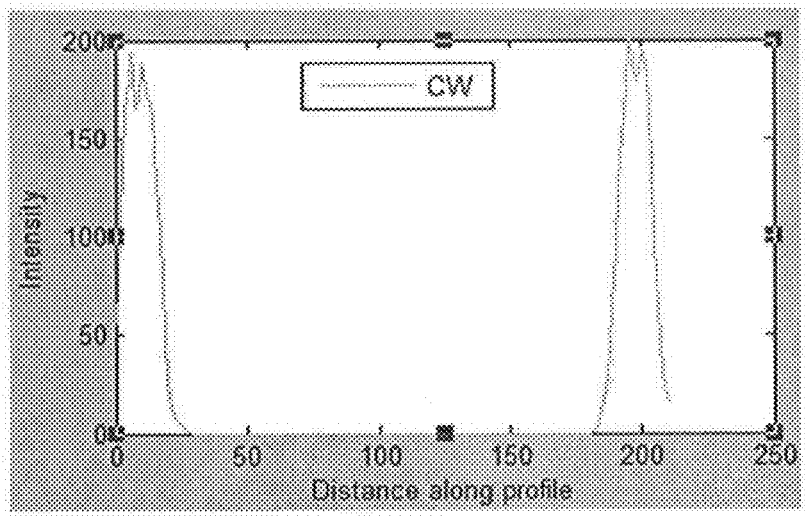
FIG. 22A is a graph showing the intensity profile of the green, counter-clockwise channel for the 62.5/125 μm multimode fiber according to an embodiment of the present invention.
Figure 22B:
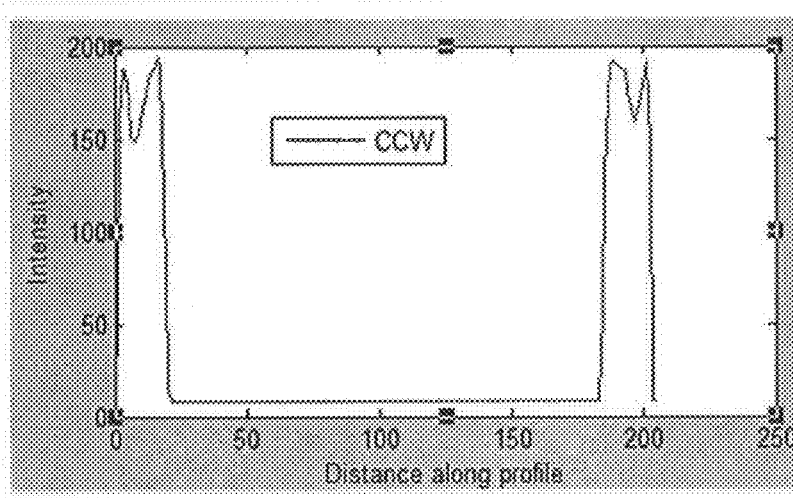
FIG. 22B is a graph showing the intensity profile of the red, clockwise channel for the 62.5/125 μm multimode fiber according to an embodiment of the present invention.
Figure 22C:
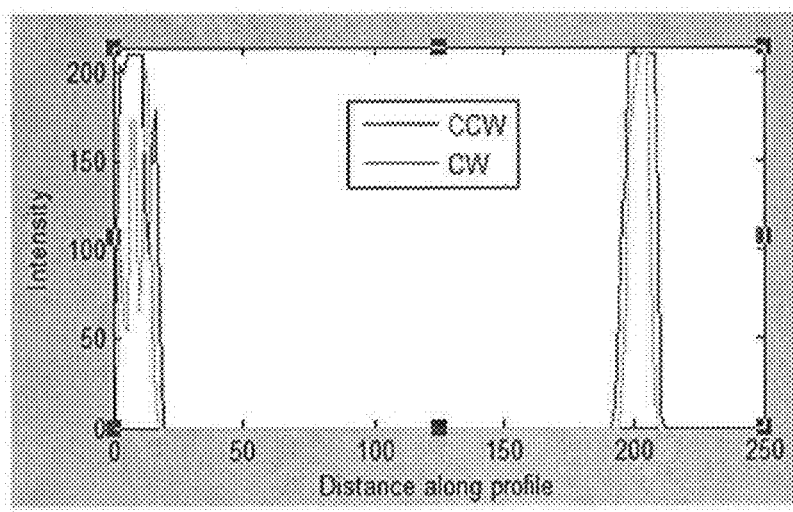
FIG. 22C is a graph showing the intensity profile of the superposition of the green, counter-clockwise channel and the red, clockwise channel for the 62.5/125 μm multimode fiber according to an embodiment of the present invention.

FIGS. 20A-20C depict the two-dimensional intensity distribution of experimental results using MATLAB® where the green curve in FIG. 20A represents the counter-clockwise channel, the red curve in middle shows the clockwise channel, and the superposition of both is presented in FIG. 20C.

FIGS. 21A-21C and 22A-22C present the output patterns and the two-dimensional intensity plots similar to those presented in FIG. 19A-19C and FIGS. 20A-C, respectively, for a SDM system utilizing 62.5/125 µm multimode fiber at complementary angles. The combination of both clockwise and counter-clockwise OAMs are presented in FIGS. 21C and 22C, highlighting the fact that complementary angles-based SDM systems will take the same radial output pattern but will carry opposite OAM.

Analysis of the SDM outputs at complementary launch angles indicate that SDM channel location is independent of wavelength and the orientation of input launch angles determine the direction of OAM.

It should be understood that the examples and embodiments described herein are for illustrative purposes only and that various modifications or changes in light thereof will be suggested to persons skilled in the art and are to be included within the spirit and purview of this application.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A multiplexed optical communication system comprising:
    a transmission optical fiber having a first end, a second end and a longitudinal axis;
    at least one TDM multiplexer, able to time division multiplex a plurality of individual input baseband signals, and having an output comprising a resulting time division multiplexed data stream;
    a first set of WDM multiplexers comprising at least one WDM multiplexer each WDM multiplexer comprising:
        a plurality of optical sources, each optical source comprising an optical-to-electrical convertor for converting said time division multiplexed data stream to an optical signal representing said time division multiplexed data stream, each optical source transmitting a unique optical wavelength signal in an output optical fiber representing said time division multiplexed data stream; and
an optical beam combiner module;
causing each unique optical wavelength signal to be combined with the other unique optical wavelength signals, forming a combined WDM optical output signal in a WDM optical output fiber;
wherein each TDM multiplexer is in electrical communication with one optical source of said first set of WDM multiplexer optical sources, such that each time division multiplexed data stream is communicated to a unique optical source;
wherein each WDM output optical fiber has a longitudinal axis and is placed in proximity to said first end of said transmission optical fiber, and wherein said longitudinal axis each of said WDM output optical fibers is disposed at an angle $\theta_i$ to said longitudinal axis of said transmission optical fiber such that each WDM output optical fiber launches a corresponding WDM optical signal into said transmission fiber forming a helically propagating non-meridional optical SDM channel, resulting in a plurality of independent helically propagating non-meridional optical SDM channels in said transmission fiber, one SDM channel for each WDM signal, each WDM signal comprising a plurality of individual optical signals with unique optical wavelengths, each individual optical signal comprising an individual TDM signal; and
said multiplexed optical communication system further comprising a WDM demultiplexer in communication with said transmission fiber and able to separate each unique optical wavelength of each optical source, producing an SDM optical output signal onto an optical fiber, and wherein each of said SDM optical output signals is communicated to a unique SDM demultiplexer;
wherein each unique SDM demultiplexer comprises photodetectors for separating each SDM optical signal from the other SDM-separated optical signals and converting each SDM optical signal to an electrical signal, producing a unique electrical TDM signal output for each SDM-separated optical signal,
wherein each of said unique TDM signal outputs is communicated to a unique TDM demultiplexer able to demultiplex each TDM signal outputs, and also able to reconstruct each of said individual input baseband signals, producing a unique electrical output data stream for each individual input baseband signal.

2. The multiplexed optical communication system of claim 1, further comprising:
a second set of TDM multiplexers;
a second set of WDM multiplexers comprising at least one WDM multiplexer, each WDM multiplexer comprising:
a plurality of optical sources, each optical source transmitting a unique optical wavelength signal in an output optical fiber; and
an optical beam combiner module;
wherein each unique optical wavelength signal is combined with the other unique optical wavelength signal forming a combined WDM optical output signal in a WDM optical output fiber;
wherein each TDM multiplexer is in electrical communication with one optical source of said second set of WDM multiplexer optical sources, such that each time division multiplexed data stream is communicated to a unique optical source;wherein each WDM output optical fiber is launched into said transmission fiber at an angle α between said longitudinal axis of said output optical fiber and said longitudinal axis of said transmission fiber, said angle α being complimentary to angle $\theta_i$ of one of said WDM output optical fibers of said plurality of WDM output optical fibers, forming at least one pair of OAM separated signals in said transmission fiber each signal of said pair having different orbital angular momentums of the same azimuthal index, one clockwise and one counterclockwise;
and wherein said SDM demultiplexer photodetectors further comprise an OAM demultiplexer for individually detecting each signal of differing orbital angular momentums of the same azimuthal index of said at least one pair of OAM separated signals;
wherein said unique electrical TDM signal outputs for each SDM-separated optical signal also comprise a unique electrical TDM signal output for each OAM-separated signal,
wherein each of said unique TDM signal outputs for each OAM-separated signal is communicated to a unique TDM demultiplexer able to demultiplex each TDM signal output, and also able to reconstruct each of said individual input baseband signals, producing a unique electrical output data stream for each individual input baseband signal.

3. The optical communication system of claim 2 wherein said plurality of optical sources is further defined as comprising an optical laser source of 532 nm wavelength, an optical laser source of 405 nm wavelength and an optical laser source of 635 nm wavelength.

4. The optical communication system of claim 2 wherein said transmission fiber is step index fiber.

5. The optical communication system of claim 4 wherein said transmission fiber is further defined as being between 62.5/125 μm to 1000/1250 μm.

6. The optical communication system of claim 2 wherein said transmission fiber is further defined as being hollow core fiber.

7. The optical communication system of claim 6 wherein said plurality of optical sources is further defined as comprising an optical laser source of 532 nm wavelength, an optical laser source of 405 nm wavelength and an optical laser source of 635 nm wavelength.

8. The optical communication system of claim 6 wherein said transmission fiber is step index fiber.

9. The optical communication system of claim 8 wherein said transmission fiber is further defined as being between 62.5/125 μm to 1000/1250 μm.

10. The optical communication system of claim 1 wherein said plurality of optical sources is further defined as comprising an optical laser source of 532 nm wavelength, an optical laser source of 405 nm wavelength and an optical laser source of 635 nm wavelength.

11. The optical communication system of claim 1 wherein said transmission fiber is step index fiber.

12. The optical communication system of claim 11 wherein said transmission fiber is further defined as being between 62.5/125 μm to 1000/1250 μm.

13. The optical communication system of claim 1 wherein said transmission fiber is further defined as being hollow core fiber.

14. The multiplexed optical communication system of claim 1, further comprising:

a second set of WDM multiplexers comprising at least one WDM multiplexer, each WDM multiplexer comprising:
   a plurality of optical sources, each optical source in electrical communication with an independent input baseband signal and each optical source transmitting a unique optical wavelength signal in an output optical fiber representing said independent input baseband signal; and
   an optical beam combiner module;
   wherein each unique optical wavelength signal is combined with the other unique optical wavelength signal forming a combined WDM optical output signal in a WDM optical output fiber;
wherein each WDM output optical fiber is launched into said transmission fiber at an angle α between said longitudinal axis of said output optical fiber and said longitudinal axis of said transmission fiber, said angle α being complimentary to angle $\theta_i$ of one of said WDM output optical fibers of said plurality of WDM output optical fibers, forming at least one pair of OAM separated signals in said transmission fiber each signal of said pair having different orbital angular momentums of the same azimuthal index, one clockwise and one counterclockwise;
and wherein said SDM demultiplexer photodetectors further comprise an OAM demultiplexer for individually detecting each signal of differing orbital angular momentums of the same azimuthal index of said at least one pair of OAM separated signals;
wherein said unique electrical individual input baseband signal for each SDM-separated optical signal also comprise a unique electrical individual input baseband signal output for each OAM-separated signal.

15. A multiplexed optical communication system comprising:
   a transmission optical fiber having a first end, a second end and a longitudinal axis; and
   a first set of WDM multiplexers comprising at least one WDM multiplexer each WDM multiplexer comprising:
     a plurality of optical sources, each optical source in electrical communication with an independent input baseband signal, and each optical source comprising optical-to-electrical convertor for converting said electrical independent input baseband signal to a corresponding optical signal, and each optical source transmitting a unique optical wavelength signal in an output optical fiber representing said independent input baseband signal; and
     an optical beam combiner module for combining said output optical fibers;
     causing each unique optical wavelength signal to be combined with the other unique optical wavelength signals, forming a combined WDM optical output signal in a WDM optical output fiber;
wherein each WDM output optical fiber has a longitudinal axis and is placed in proximity to said first end of said transmission optical, and wherein said longitudinal axis each of said WDM output optical fibers is disposed at an angle $\theta_i$ to said longitudinal axis of said transmission optical fiber such that each WDM output optical fiber launches a corresponding WDM optical signal into said transmission fiber forming a helically propagating non-meridional optical SDM channel, resulting in a plurality of independent helically propagating non-meridional optical SDM channels in said transmission fiber, one SDM channel for each WDM signal, each WDM signal comprising a plurality of individual optical signals with unique optical wavelengths, each individual optical signal comprising an individual input baseband signal; and
said multiplexed optical communication system further comprising a WDM demultiplexer in communication with said transmission fiber and able to separate each unique optical wavelength of each optical source, producing an SDM optical output signal onto an optical fiber, and wherein each of said SDM optical output signals is communicated to a unique SDM demultiplexer;
wherein each unique SDM demultiplexer comprises photodetectors for separating each SDM-separated optical signal from the other SDM-separated optical signals and converting each SDM optical signal to an electrical signal, producing a unique electrical signal output for each SDM-separated optical signal such that each individual input baseband signal is recreated at an electrical output of said SDM demultiplexer.

16. The optical communication system of claim 15 wherein said plurality of optical sources is further defined as comprising an optical laser source of 532 nm wavelength, an optical laser source of 405 nm wavelength and an optical laser source of 635 nm wavelength.

17. The optical communication system of claim 15 wherein said transmission fiber is step index fiber.

18. The optical communication system of claim 17 wherein said transmission fiber is further defined as being between 62.5/125 µm to 1000/1250 µm.

19. The optical communication system of claim 15 wherein said transmission fiber is further defined as being hollow core fiber.

\* \* \* \* \*